(12) United States Patent
Amatucci et al.

(10) Patent No.: US 7,947,392 B2
(45) Date of Patent: *May 24, 2011

(54) BISMUTH FLUORIDE BASED NANOCOMPOSITES AS ELECTRODE MATERIALS

(75) Inventors: Glenn G. Amatucci, Peapack, NJ (US); Fadwa Badway, Old Bridge, NJ (US); Mathieu Bervas, Chatou (FR)

(73) Assignee: Rutgers The State University of New Jersey, U.S.

( * ) Notice: Subject to any disclaimer, the term of this patent is extended or adjusted under 35 U.S.C. 154(b) by 256 days.

This patent is subject to a terminal disclaimer.

(21) Appl. No.: 11/576,378

(22) PCT Filed: Sep. 30, 2005

(86) PCT No.: PCT/US2005/035625
§ 371 (c)(1),
(2), (4) Date: Jun. 25, 2007

(87) PCT Pub. No.: WO2006/137903
PCT Pub. Date: Dec. 28, 2006

(65) Prior Publication Data
US 2007/0243466 A1   Oct. 18, 2007

Related U.S. Application Data

(60) Provisional application No. 60/615,480, filed on Oct. 1, 2004.

(51) Int. Cl.
*H01M 4/58* (2010.01)
*H01M 4/62* (2006.01)
*C01B 9/08* (2006.01)

(52) U.S. Cl. .......... 429/218.1; 429/232; 252/182.1; 423/489

(58) Field of Classification Search .......... 429/218.1, 429/232; 423/277, 475, 489; 252/182.1
See application file for complete search history.

(56) References Cited

U.S. PATENT DOCUMENTS

| | | | |
|---|---|---|---|
| 4,127,708 A | 11/1978 | Liang et al. | |
| 6,379,841 B1 | 4/2002 | Potanin et al. | |
| 6,423,131 B1 | 7/2002 | Seeger et al. | |
| 6,686,090 B2 | 2/2004 | Inagaki et al. | |
| 6,753,112 B2 * | 6/2004 | Ooya et al. | 429/232 |
| 7,169,471 B1 | 1/2007 | Dreher et al. | |
| 2001/0046629 A1 * | 11/2001 | Inagaki et al. | 429/218.1 X |
| 2004/0062994 A1 | 4/2004 | Amatucci et al. | |
| 2007/0190414 A1 * | 8/2007 | Amatucci et al. | 429/218.1 |

OTHER PUBLICATIONS

Nel et al., "Toxic Potential of Materials at the Nanolevel", Science, vol. 311, pp. 622-627 (Feb. 3, 2006).*
Hajime Arai, Shigeto Okada, Yoji Sakurai and Jun-ichi Yamaki. "Cathode Performance and Voltage Estimation of Metal Trihalides", Journal of Power Sources, 68, 716-719 (1997).
A. Robert Armstrong and Peter G. Bruce. "Synthesis of Layered LiMnO2 as an Electrode for Rechargeable Lithium Batteries", Nature, 381, 499-500 (1996).

(Continued)

*Primary Examiner* — Stephen J. Kalafut

(57) ABSTRACT

The present invention relates to primary and secondary electrochemical energy storage systems, particularly to such systems as battery cells, which use materials that take up and release ions as a means of storing and supplying electrical energy. The present positive electrode composition comprises a nanocrystalline bismuth fluoride compound, which comprises $Bi^{+3}$, and has a maximum energy density of 7170 $Wh/l^{-1}$.

89 Claims, 15 Drawing Sheets

Lithiation transport mechanism A x in $Li_xBiF_3$

Lithiation transport mechanism B

OTHER PUBLICATIONS

F. Badway, N. Pereira, F. Cosandey and G. G. Amatucci. "Structure and Electrochemistry of $FeF_3$:C", Journal of The Electrochemical Society, 150 (9), A1209-A1218 (2003).

F. Badway, F. Cosandey, N. Pereira and G. G. Amatucci. "High-Capacity Reversible Metal Fluoride Conversion Materials as Rechargeable Positive Electrodes for Li Batteries", Journal of The Electrochemical Society, 150 (10), A1318-A1327 (2003).

M. Bervas, F. Badway, L.C. Klein and G. G. Amatucci. "Bismuth Fluoride Nanocomposite as a Positive Electrode Material for Rechargeable Lithium Batteries", Electromechanical and Solid-State Letters, 8 (4), A179-A183 (2005).

M. Bervas, L.C. Klein and G. G. Amatucci. "Reversible Conversion Reactions with Lithium in Bismuth Oxyfluoride Nanocomposites", Journal of The Electrochemical Society, 153 (4), A159-A170 (2006).

M. Bervas, A.N. Mansour, W.-S. Yoon, J.F. Al-Sharab, F. Badway, F. Cosandey, L.C. Klein and G. G. Amatucci. "Investigation of the Lithiation and Delithiation Conversion Mechanisms of Bismuth Fluoride Nanocomposites", Journal of The Electrochemical Society, 153 (1), A799-A808 (2006).

P. Fiordiponti, S. Panero, G. Pistoia and C. Temperoni. "Nonaqueous Batteries with $BiF_3$ Cathodes", Journal of The Electrochemical Society, 125 (4), 511-515 (1978).

K. Mizushima, P.C. Jones, P.J. Wiseman and J.B. Goodenough. "$Li_xCoO_2$: A New Cathode Material for Batteries of High Energy Density", Mater. Res. Bull, 15, 783-799 (1980).

A.K. Padhi, K.S. Nanjundaswamy and J.B. Goodenough. "Phospho-olivines as Positive-Electrode Materials for Rechargeable Lithium Batteries", Journal of The Electrochemical Society, 144 (4), 1188-1194 (1997).

A.K. Padhi, K.S. Nanjundaswamy, C. Masquelier, S. Okada and J.B. Goodenough. "Effect of Structure on the $Fe^{3+}/Fe^{2+}$ Redox Couple in Iron Phosphates", Journal of The Electrochemical Society, 144 (5), 1609-1613 (1997).

I. Plitz, F. Badway, J. Al-Sharab, A. DuPasquier, F. Cosandey and G. G. Amatucci. "Structure and Electrochemistry of Carbon-Metal Fluoride Nanocomposites Fabricated by Solid-State Redox Conversion Reaction", Journal of The Electrochemical Society, 152 (2), A307-A315 (2005).

J.M. Tarascon, E. Wong, F. K. Shokoohi, W.R. McKinnon and S. Colson. "The Spinel Phase of $LiMn_2O_4$ as a Cathode in Secondary Lithium Cells", Journal of Electrochemical Society, 138 (10), 2859-2864 (1991).

M. M. Thackeray, W. I. F. David, P. G. Bruce and J. B. Goodenough. "Lithium Insertion into Manganese Spinels". Mater. Res. Bull. 18, 461-472 (1983).

M.G.S.R. Thomas, W.I.F. David, J.B. Goodenough and P. Groves. "Synthesis and Structural Characterization of the Normal Spinel Li[$Ni_2$]$O_4$", Mater. Res. Bull. 20, 1137-1146 (1985).

Written Opinion of the International Searching Authority dated Sep. 20, 2007.

International Search Report and Written Opinion dated Nov. 26, 2007.

\* cited by examiner

US 7,947,392 B2

BISMUTH FLUORIDE BASED NANOCOMPOSITES AS ELECTRODE MATERIALS

CROSS REFERENCE TO RELATED APPLICATIONS

This application claims priority to U.S. Provisional application No. 60/615,480 filed Oct. 1, 2004, the entire disclosure of which is incorporated by reference.

GOVERNMENT RIGHTS

This invention was made with government support. The government has certain rights in the invention.

FIELD OF THE INVENTION

The present invention relates to primary and secondary electrochemical energy storage systems, particularly to such systems as battery cells, which use materials that take up and release ions as a means of storing and supplying electrical energy.

BACKGROUND OF THE INVENTION

The lithium-ion battery cell is the premiere high-energy rechargeable energy storage technology of the present day. Unfortunately, its high performance still falls short of energy density goals in applications ranging from telecommunications to biomedical. Although a number of factors within the cell contribute to this performance parameter, the most crucial ones relate to how much energy can be stored in the electrode materials of the cell.

During the course of development of rechargeable electrochemical cells, such as lithium (Li) and lithium-ion battery cells and the like, numerous materials capable of reversibly accommodating lithium ions have been investigated. Among these, occlusion and intercalation materials, such as carbonaceous compounds, layered transition metal oxide, and three dimensional pathway spinels, have proved to be particularly well-suited to such applications. However, even while performing reasonably well in recycling electrical storage systems of significant capacity, many of these materials exhibit detrimental properties, such as marginal environmental compatibility and safety, which detract from the ultimate acceptability of the rechargeable cells. In addition, some of the more promising materials are available only at costs that limit widespread use. However, of most importance is the fact that the present state of the art materials only have the capability to store relatively low capacity of charge per weight or volume of material (e.g. specific capacity, (mAh/g); gravimetric energy density (Wh/kg$^{-1}$); volumetric energy density, (Wh/l$^{-1}$)).

Materials of choice in the fabrication of rechargeable battery cells, particularly highly desirable and broadly implemented Li-ion cells, for some considerable time have centered upon graphitic negative electrode compositions, which provide respectable capacity levels in the range of 300 mAh/g. Unfortunately, complementary positive electrode materials in present cells use less effective layered intercalation compounds, such as LiCoO$_2$, which generally provide capacities only in the range of 150 mAh/g.

Intercalation compounds are not highly effective because the intercalation process is not an ideal energy storage mechanism. This situation occurs because of the limited number of vacancies available for lithium. An alternative process, reversible conversion, allows for all of the oxidation states of a compound to be utilized. The reversible conversion reaction proceeds as follows:

$$n\text{Li}^+ + ne^- + \text{Me}^{n+}\text{X} \longleftrightarrow n\text{LiX} + \text{Me}$$

where Me is a metal and X is O$^{-2}$, S$^{2-}$, N$^-$ or F$^-$. This reaction can lead to much higher capacities than can an intercalation reaction and, therefore, to much higher energy densities.

Badway et al. (*Journal of The Electrochemical Society*, 150(9) A1209-A1218 (2003)), for example, has described electrode materials having high specific capacities via a reversible conversion reaction. They reported specific capacities for carbon metal fluoride nanocomposites, such as a carbon FeF$_3$ nanocomposite, active for this reaction, having >90% recovery of its theoretical capacity (>600 mA/g) in the 4.5-1.5 V region. They attained this major improvement in specific capacity by reducing the particle size of FeF$_3$ to the nanodimension level in combination with highly conductive carbon.

Reversible conversion reactions may also be active for other metal fluorides. Bismuth fluoride, for example, is known to have a thermodynamic condition favorable for a 3V electrode material in lithium batteries, a voltage particularly useful for the development of a wide range of products from biomedical to telecommunications. Furthermore, the theoretical specific capacity, gravimetric energy density and volumetric energy density of bismuth fluoride exceed those of LiCoO$_2$. The theoretical gravimetric and volumetric densities for BiF$_3$ are, for example, 905 Wh/kg$^{-1}$, and 7170 Wh/l$^{-1}$, respectively, for the equation:

$$\text{BiF}_3 \longleftrightarrow 3\text{LiF} + \text{Bi}$$

whereas such energy densities for the reaction $$\text{LiCoO}_2 \longleftrightarrow \text{Li}_x\text{CoO}_2 + \text{Li}$$

are only 560 Wh/kg$^{-1}$ and 2845 Wh/l$^{-1}$.

However, to date, bismuth fluoride has not been utilized as a positive electrode material in Li-ion battery cells. Most transition metal fluorides are insulators and possess little or no electrochemical activity as macromaterials. The present invention solves this problem by reducing the particle size of bismuth fluoride composites to the nanodimensional level in combination with a conductive matrix.

SUMMARY OF THE INVENTION

The invention provides a composition including a nanocrystalline bismuth fluoride compound.

In another embodiment, the invention provides a composition including a nanocrystalline bismuth fluoride compound nanocomposite.

In a further embodiment, the invention provides a composition including a bismuth fluoride compound nanocomposite.

Finally, the invention provided herein is an electrochemical cell including a negative electrode; a positive electrode including a bismuth fluoride compound nanocomposite and a separator disposed between the negative and positive electrodes.

DETAILED DESCRIPTION OF THE INVENTION

Figure 1:
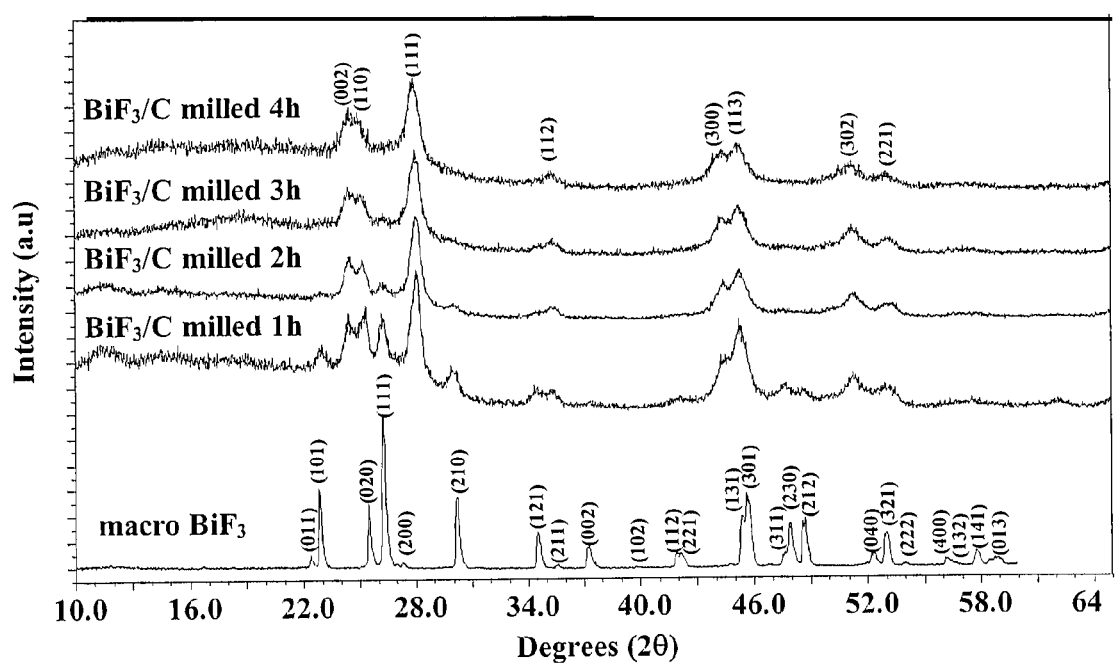
FIG. 1. XRD patterns of the pristine macro BiF$_3$ and of the macro BiF$_3$ high-energy milled in He for 1 h, 2 h, 3 h and 4 h in the presence of carbon Super P, showing the phase transformation from orthorhombic (SG Pnma) to Tysonite (SG P(-3)c1)

The present invention provides improved materials for battery components, specifically for positive electrodes in primary and rechargeable battery cells.

Provided herein is a composition including a nanocrystalline bismuth fluoride compound. The phrase "bismuth fluoride compound" includes any compound that comprises the elements of bismuth (Bi) and fluorine (F). Examples of bismuth fluoride compounds include, but are not limited to, BiF$_3$.

As used herein, "nanocrystalline size" or "nanocrystalline" are used interchangeably and refer to particles of about 100 nm or less. As is well known in the art, crystallite size may be determined by common methodologies such as peak breadth analysis in X-ray diffraction (XRD) and high resolution transmission electron microscopy (HRTEM).

In a preferred embodiment, the bismuth fluoride compound of nanocrystalline size includes a bismuth fluoride compound wherein bismuth has an ionic charge of Bi$^{5+}$. In another preferred embodiment, the bismuth has an ionic charge of Bi$^{3+}$. Preferably, the nanocrystalline bismuth fluoride compound of the inventive composition is BiF$_3$.

Preferably, the bismuth fluoride compound of nanocrystalline size includes a bismuth fluoride compound having the formula BiF$_z$, wherein 3≦z≦5. Even more preferably, the Bi cation in BiF$_z$, wherein 3≦z≦5 has a charge of Bi$^{5+}$.

In another embodiment, the charge of a bismuth cation may be partially substituted with a metal cation. As used herein "partial substitution" refers to a condition where an alternative cation is placed within the atomic crystal structure of the bismuth compound. Charge compensation can be made by a change in charge of the Bi cation or change in anion content such as loss of F$^-$ or gain of O$^{2-}$.

Suitable metal elements having charges that may be included in the inventive crystalline bismuth fluoride compound that can partially substitute the charge of a bismuth cation include, but are not limited to, non-transition metals and transition metals, preferably transition metals, and more preferably first row transition metals. Specific examples of metals for use in the inventive composition include, but are not limited to, Fe, B, Co, Ni, Mn, V, Mo, Pb, Sb, Cu, Sn, Nb, Cr, Ag, and Zn. Preferably, Mo or Cu are included in the inventive composition. It is desirable, but not required, that such compounds retain both electrical and ionic conductivity.

In a preferred embodiment, when Cu is the metal whose cations may act to partially substitute the Bi cation included in the nanocrystalline bismuth fluoride inventive composition, the compound is of the formula Bi$_{1-x}$Cu$_x$F$_{3-x}$, where 0<x<1.

As used herein, metal elements refer to simple substances which cannot be resolved into simpler substances by normal chemical means.

In another embodiment, the bismuth fluoride compound further includes oxygen. One of skill in the art will recognize that oxygen can substitute for fluorine in metal fluorides. Oxygen may act to significantly improve the electrical conductivity of the nanocrystalline bismuth fluoride compound of the invention. For example, oxygen may replace, partially, the fluorine in, for example, Bi$^{5+}$F$_5$ resulting in Bi$^{5+}$OF$_3$. Preferably, when oxygen is included in the bismuth fluoride inventive composition, the compound includes BiO$_x$F$_{z-2x}$, wherein 3≦z≦5 and 0≦x≦1.5.

The invention also provides a composition including a nanocrystalline bismuth fluoride compound nanocomposite. The phrase "nanocrystalline bismuth fluoride compound nanocomposite" as used herein means nanocrystallites comprising at least a bismuth fluoride compound incorporated within a matrix.

In one embodiment, the matrix is composed of particles or crystallites of a nanocrystalline size.

In another embodiment, the matrix is composed of particles of macrodimensional size. As used herein, "macrodimensional size" or "macrocrystalline size" are used interchangeably and refer to particles greater than 100 nm.

In a preferred embodiment, the matrix is a conductive matrix. As used herein, a "conductive matrix" refers to a matrix that includes conductive materials, some of which may be ionic and/or electronic conductors. Preferably, the matrix will retain both ionic and electronic conductivity; such materials are commonly referred to as "mixed conductors."

In one embodiment, the conductive matrix is carbon. Preferably, less than 50 weight % of carbon is used. More preferably, less than 25 weight % carbon is used. Even more preferably less than 5 weight % carbon is used.

In another embodiment, the conductive matrix is a metal sulfide. In a further embodiment, the conductive matrix is a metal nitride. Preferably, the conductive matrix is a metal oxide. In another preferred embodiment, the conductive matrix is a metal fluoride. In yet, still another preferred embodiment, the conductive matrix is a metal oxyfluoride.

Preferably, the metal from the metal oxide, metal fluoride or the metal oxyfluoride is Fe, B, Bi, Co, Ni, Mn, V, Mo, Pb, Sb, Cu, Sn, Nb, Cr, Ag or Zn.

Suitable metal sulfides include, but are not limited to, molybdenum sulfides, molybdenum oxysulfides, and titanium sulfide. Suitable metal nitrides include, but are not limited to, copper nitride, molybdenum nitride, and titanium nitride. Suitable metal oxide conductive matrices include, but are not limited to, $VO_2$, $MoO_2$, NiO, $V_2O_5$, $V_6O_{13}$, CuO, $MnO_2$, chromium oxides and $MoO_3$. Suitable metal fluoride conductive matrices include, but are not limited to $MoF_3$, $MoF_4$, $Ag_2F$. Suitable metal oxyfluoride conductive matrices include, but are not limited to, $MoO_xF_z$, wherein x is $0 \leq x \leq 3$ and z is $0 \leq Li \leq 5$ and combined in such a way that the effective charge on the Mo cation is not more than 6+. Preferably, the conductive matrix is $MoO_3$.

In a preferred embodiment, the conductive matrix is present in an amount that is less than about 50 weight % of the nanocomposite.

In yet another embodiment, the nanocrystalline bismuth fluoride compound of the inventive nanocomposite includes carbon. Preferably, less than 50 weight % of carbon is used. More preferably, less than 25 weight % carbon is used. Even more preferably less than 5 weight % carbon is used.

In yet another embodiment, both oxygen and a metal are included in the bismuth fluoride compound of the nanocomposite of the present invention. In a preferred embodiment, the compound is of the formula $Bi_{1-x}Me_xF_{3-z}O_w$, wherein Me is a metal and x<1 and w<z. Preferably, the metal is copper.

In another embodiment, the nanocrystalline bismuth fluoride compound of the inventive nanocomposite includes crystallites that are less than about 100 nm in diameter; preferably, less than about 50 nm in diameter; and even more preferably less than about 20 nm in diameter.

The nanocrystalline bismuth fluoride compound of the inventive nanocomposite preferably includes $Bi^{5+}$ or $Bi^{3+}$ as described above. Even more preferably, the compound of the inventive nanocomposite is $BiF_z$ wherein $3 \leq z \leq 5$. In this embodiment, Bi is preferably $Bi^{3+}$. Preferably, $BiF_z$ is $BiF_3$. Furthermore, the bismuth fluoride compound of the nanocomposite can include a Bi cation wherein a metal cation is in partial substitution of the Bi cation as described above.

In another embodiment, the specific capacity of the nanocrystalline bismuth fluoride nanocomposite is reversible. As used herein, "specific capacity" refers to the amount of energy the bismuth fluoride compound nanocomposite contains in milliamp hours (mAh) per unit weight. "Reversible specific capacity" means that the nanocomposite of the present invention may be recharged by passing a current through it in a direction opposite to that of discharge.

In another embodiment, the nanocrystalline bismuth fluoride compound of the inventive nanocomposites demonstrates a conversion reaction. As used herein "conversion reactions" are decomposition reactions in which the bismuth fluoride compound of the nanocomposites of the present invention are fully reduced during battery cell discharge to $Bi^0$ with the concomitant formation of a lithium, magnesium or calcium compound.

Preferably, the nanocrystalline bismuth fluoride compound of the nanocomposite of the invention is $BiF_3$ and is capable of a conversion reaction. In this embodiment, the conversion reaction corresponds to the following chemical equation.

$$BiF_3 + 3Li^+ + 3e^- \rightarrow 3LiF + Bi^0$$

In another embodiment, the conversion reaction of the bismuth fluoride compound nanocomposite of the present invention is reversible. As used herein, "reversible conversion reactions" are reactions in which the nanocrystalline bismuth fluoride compound of the nanocomposite of the present invention is capable of reforming during a battery cell charge.

Preferably, the nanocrystalline bismuth fluoride compound of the nanocomposite of the present invention that is capable of a reversible conversion reaction is $BiF_3$. In this embodiment, the chemical equation is $$BiF_3 + 3Li^+ + 3e^- \rightleftharpoons 3LiF + Bi^0$$

In another embodiment, the nanocrystalline bismuth fluoride compound of the inventive nanocomposite includes orthorhombic crystallites. As used herein "orthorhombic crystallites" refer to a crystalline structure of three mutually perpendicular axes of different length. In a more preferred embodiment, the orthorhombic crystallites include Pnma space groups.

As used herein "space group" refers to an arrangement of the crystallites into orderly arrays. Pnma space groups result in a crystal arrangement as described in JCPDS-International Centre for Diffraction Data®, Card 15-0053.

In an even more preferred embodiment, the nanocrystalline bismuth fluoride compound of the inventive nanocomposite includes tysonite crystallites. As used herein "tysonite crystallites" refers to crystalline structures of a hexagonal shape. Yet, even more preferably, the tysonite crystallites have P(-3) c1 space groups. P(-3)c1 space groups result in a crystal arrangement as described in JCPDS-International Centre for Diffraction Data®, Card 35-038.

In another embodiment, the nanocrystalline bismuth fluoride compound of the inventive nanocomposite including orthorhombic crystallites is capable of a conversion reaction. Preferably, these crystallites include Pnma space groups. Even more preferably, the nanocrystalline bismuth fluoride compound of the inventive nanocomposite is an orthorhombic $BiF_3$ compound having Puma space groups and is capable of a conversion reaction. The corresponding chemical reaction is $$BiF_3 Pnma + 3Li^+ + 3e^- \rightarrow 3LiF + Bi^0$$

In another embodiment, the nanocrystalline bismuth fluoride compound of the inventive nanocomposite, that includes tysonite crystallites, is capable of a conversion reaction. In a more preferred embodiment, the conversion reaction is reversible. Preferably, these crystallites include P(-3)c1 space groups. Even more preferably, the nanocrystalline bismuth fluoride compound of the inventive nanocomposite is a tysonite $BiF_3$ compound having P(-3)c1 space groups and is capable of a conversion reaction. Even more preferably, the reaction is reversible. Without being bound by theory, the corresponding chemical reactions are:

$$\text{Tysonite-BiF}_3\ P(-3)c1 + 3Li^+ + 3e^- \underset{\text{reversible conversion}}{\overset{\text{conversion}}{\rightleftharpoons}} 3LiF + Bi^0 \text{ conversion}$$

In a preferred embodiment, the nanocrystalline bismuth fluoride compound of the inventive nanocomposites is capable of phase transformation. As used herein "phase transformation" refers to a phenomenon where the crystallite structure of the nanocrystalline bismuth fluoride compound of the present invention transforms into a different crystallite structure. Transformation can occur during battery cell cycling, or, for example, during high-energy milling of the nanocrystalline bismuth fluoride compound. In a preferred embodiment, the nanocrystalline bismuth fluoride compound of the inventive nanocomposite is capable of transforming from a tysonite crystallite into a orthorhombic crystallite. In a more preferred embodiment, the nanocrystalline bismuth fluoride compound of the inventive nanocomposite is capable of transforming from an orthorhombic crystallite into a tysonite crystallite. In an even more preferred embodiment, the nanocrystalline bismuth fluoride compound of the inventive nanocomposite is an orthorhombic crystallite $BiF_3$ compound capable of phase transformation into a tysonite crystallite $BiF_3$ compound according to the equation:

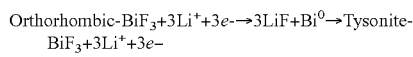

$$\text{Orthorhombic-}BiF_3 + 3Li^+ + 3e^- \rightarrow 3LiF + Bi^0 \rightarrow \text{Tysonite-}BiF_3 + 3Li^+ + 3e^-$$

The inventive nanocomposites may be prepared by extreme, high impact-energy milling of a mixture that includes a bismuth fluoride compound and, optionally, a second metal such as copper and/or carbon and/or oxygen. Thus, the nanocrystalline bismuth fluoride compound nanocomposite of the present invention can be prepared by using an impact mixer/mill such as the commercially available SPEX 8000 device (SPEX Industries, Edison N.J., USA). Unlike the shearing action of conventional planetary, roller, or ball mills, which at best may allow for size reduction of crystallite particles to the micrometer range, the extremely high-energy impact action impressed upon the component mixture by the impact mill provides, within milling periods as short as about 10 minutes, a particle size reduction of the processed material to the nanodimensional range of less than about 100 nm. Further milling for as little as 30 minutes, up to about 4 hours, brings about crystallite-particle size reduction to less than about 40 nm.

Other methods may be used to form the nanocomposites of the present invention. As will be evident to a skilled artisan, solution or gel techniques may be used to fabricate the nanocomposites.

When bismuth fluoride is milled with another component, the bismuth fluoride undergoes chemical changes such that its X ray diffraction characteristics takes on the character of a new, highly electrochemically active material, although retaining major aspects of the bismuth fluoride. In addition, the nanocrystallite formation can be easily characterized by well known methods such as Bragg peak broadening in x-ray diffraction and microscopy by methods such as transmission electron microscopy.

In one embodiment, milling occurs for about three hours to obtain tysonite bismuth fluoride compounds of the nanocomposite. Preferably, the milling results in bismuth fluoride crystallites that are nanostructured in a conductive matrix. In this form, surface area contact with an electrolyte is less than that of typical discrete nanoparticles, which can result in improved cycle life performance. To enhance the size and density of the nanocomposites without affecting nanocrystallinity, brief thermal annealing may be utilized or the present of known sintering aids such as glass fluxes.

In another embodiment, the orthorhombic nanocrystalline bismuth fluoride compound nanocomposites are formed by milling the inventive tysonite bismuth fluoride compound of the nanocomposite for one hour in the presence of HF.

In another aspect of the present invention, a composition including a bismuth fluoride compound nanocomposite is provided. In one embodiment of this aspect of the invention, the inventive nanocomposite is comprised of a nanocrystalline bismuth fluoride compound in a matrix. In another embodiment, the inventive composite is comprised of a bismuth fluoride compound of nanocrystalline particles in a nanocrystalline matrix. In another embodiment, the inventive nanocomposite comprises a bismuth fluoride compound in a nanocrystalline matrix. \

In another aspect of the present invention, an electrochemical cell, preferably a primary or, more preferably, a rechargeable battery cell, is provided, which employs the inventive bismuth fluoride compound nanocomposites, or the nanocrystalline bismuth fluoride nanocomposites of the present invention, as described herein, as the cathode material. The cell may be prepared by any known method. The inventive nanocomposite electrode (cathode) materials function well with most other known primary or secondary cell composition components, including polymeric matrices and adjunct compounds, as well as with commonly used separator and electrolyte solvents and solutes.

For example, electrolyte compositions commonly used in known rechargeable electrochemical-cell fabrication serve equally well in the cells of the present invention. These electrolyte compositions may include one or more metallic salts, such as, but not limited to, lithium, magnesium, calcium and yttrium. Lithium salts, such as $LiPF_6$, $LiBF_4$, $LiClO_4$, and the like, dissolved in common cyclic and acyclic organic solvents, such as ethylene carbonate, dimethyl carbonate, propylene carbonate, ethyl methyl carbonate, and mixtures thereof, may be used. As with optimization of the nanocomposites of the present invention, specific combinations of electrolyte components will be a matter of the preference of the cell fabricator and may depend on an intended use of the cell, although consideration may be given to the use of solutes such as $LiBF_4$, which appear less susceptible during cell cycling to hydrolytically forming HF, which could affect the optimum performance of some metal fluorides. For such reason, for instance, a $LiBF_4$:propylene carbonate electrolyte may be preferred over one comprising a long-utilized standard solution of $LiPF_6$ in a mixture of ethylene carbonate:dimethyl carbonate. In addition, such nanocomposites may be incorporated into solid state polymer cells utilizing solid state ionically conducting matrices derived from compounds such as polyethylene oxide (PEO). Nanocomposites also may be fabricated by thin film deposition techniques and may be incorporated into solid state thin film lithium batteries utilizing a glassy electrolyte. Finally, such electrode materials may be incorporated into cells utilizing ionic liquid solvents as the electrolytes.

Likewise, the negative electrode members of electrochemical cells may advantageously include any of the widely used known ion sources such as lithium metal and lithium alloys, such as those comprised of lithium tin, lithium silicon, lithium aluminum, lithiated carbons such as those based on coke, hard carbon, graphite, nanotubes or $C_{60}$, and lithiated metal nitrides.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and described the methods and/or materials in connection with which the publications are cited.

It must be noted that as used herein and in the appended claims, the singular forms "a", "and", and "the" include plural references unless the context clearly dictates otherwise. All technical and scientific terms used herein have the same meaning.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Preparation of the Tysonite and Orthorhombic $BiF_3$ Nanocomposites of the Invention a. Tysonite In order to prepare the tysonite $BiF_3$ nanocomposites of the present invention, a sample of 85 weight % $BiF_3$, (Alfa Aesar) and 15 weight % carbon of carbon black (Super P, 3M), were milled for one to three hours in a Spex 8000 mill. The high-energy milling cell, as well as the balls, were made out of hardened steel. The high-energy milling cell was sealed and reopened after milling inside a He filled glove box at −80° C. dew point, thus preventing the powder from moisture or oxygen contamination. The resulting inventive tysonite nanocomposites were composed of crystallites of 30 nm or less.

Orthorhombic $BiF_3$ inventive nanocomposites were prepared by treating tysonite $BiF_3$ nanocomposites with 48% concentrated hydrofluoric acid in a Teflon container. The container then was placed overnight in an oven at 95° C. to let the HF evaporate. The powder thus obtained then was dried a second time overnight at 120° C. under vacuum before entering the glove box for one hour of high energy milling. The resulting inventive orthorhombic nanocomposites were composed of crystallites of approximately 30 nm. The size of the orthorhombic crystallites was found to be more uniform than those of the tysonite crystallites.

Example 2

Electrode Preparation

Electrodes were prepared by adding poly-vinylidene fluoride-co-hexafluoropropylene (Kynar 280, Elf Atochem), carbon black (Super P, 3M), and dibutyl phthalate (Aldrich) to the inventive nanocomposites in acetone. The slurry was tape cast, dried for 1 hour at 22° C., and rinsed in 99.8% anhydrous ether (Aldrich) to extract the dibutyl phthalate plasticizer. The electrodes, 1 $cm^2$ disks, or coin cells, typically containing 57+/−1% inventive nanocomposites and 12+/−1% carbon black, were tested electrochemically versus Li metal (Johnson Matthey). The coin cells were cycled under controlled temperatures. The batteries were cycled either on an Arbin, a Maccor or a Mac Pile (Biologic). Three different electrolytes were used: 1) $LiPF_6$ salt in a mixture of ethylene carbonate (EC)/propylene carbonate (PC)/diethyl carbonate (DEC)/dimethyl carbonate (DMC) solvents at 1 M, (1:1 ratio by volume) 2) $LiPF_6$ in EC/DMC at 1 M (1:1 ratio by volume) or 3) $LiClO_4$ in EC/DMC at 0.4 M (1:1 ratio by volume).

Example 3

Physical Characterization of the Tysonite and Orthorhombic $BiF_3$ Nanocomposites of the Invention a. XRD Analysis In order to characterize the structure of the inventive $BiF_3$ nanocomposites, XRD analyses were performed on a Sintag X2 using Cu Kα radiation. The inventive nanocomposites were placed on glass slides and covered with a Kapton film sealed with silicon based vacuum grease inside a glove box to minimize air exposure.

The XRD patterns of the pristine macro $BiF_3$ powder and of the macro $BiF_3$ powder high-energy milled in He in the presence of 15 wt % of carbon Super P for 1 h, 2 h, 3 h and 4 h are shown on FIG. 1. It is readily apparent from this figure that $BiF_3$ undergoes a phase transformation from the initial orthorhombic phase to a hexagonal Tysonite phase. The calculated lattice parameters of this phase are a=7.100±0.004 Å and c=7.292±0.007 Å.

After one hour of high-energy milling, the ratio of tysonite/orthorhombic phases has been evaluated as 70:30, respectively, from the relative intensity of their respective $I_{100}$ Bragg's reflections. This ratio increases with milling time. The transformation is complete after a milling time between 3 h and 4 h, as seen from the disappearance of the ortho $BiF_3$ reflection at 210 degrees 2θ and appearance of the tysonite $BiF_3$ reflection at 111 degrees 2θ.

Another feature clearly apparent on the XRD patterns of FIG. 1 is the broadening of the diffraction peaks between the macro $BiF_3$ and the $BiF_3/C$ nanocomposite high-energy milled for one hour. Peak broadening is consistent with the diminution of the primary crystallite size. (See, eg., Berves et al., *Electromechanical and Solid-State Letters*, 8(4) A 147-A183 (2005), which is herein incorporated by reference.)

b. Selected Area Electron Diffraction Analysis

Selected area electron diffraction analysis (SAED) was performed on the $BiF_3/C$ nanocomposite to characterize the patterns of $BiF_3$ phases at one hour of milling time. SAED pictures were taken with a Topcon 002B transmission electron microscope (TEM). Powder samples were first dispersed in dimethyl carbonate, a few drops of which were then disposed on a Lacey carbon grid and allowed to dry overnight inside a glove box. The grids to be analyzed were placed in a bag and sealed inside the glove box. The glove box was re-opened only to put the grid into the TEM column.

Figure 2:
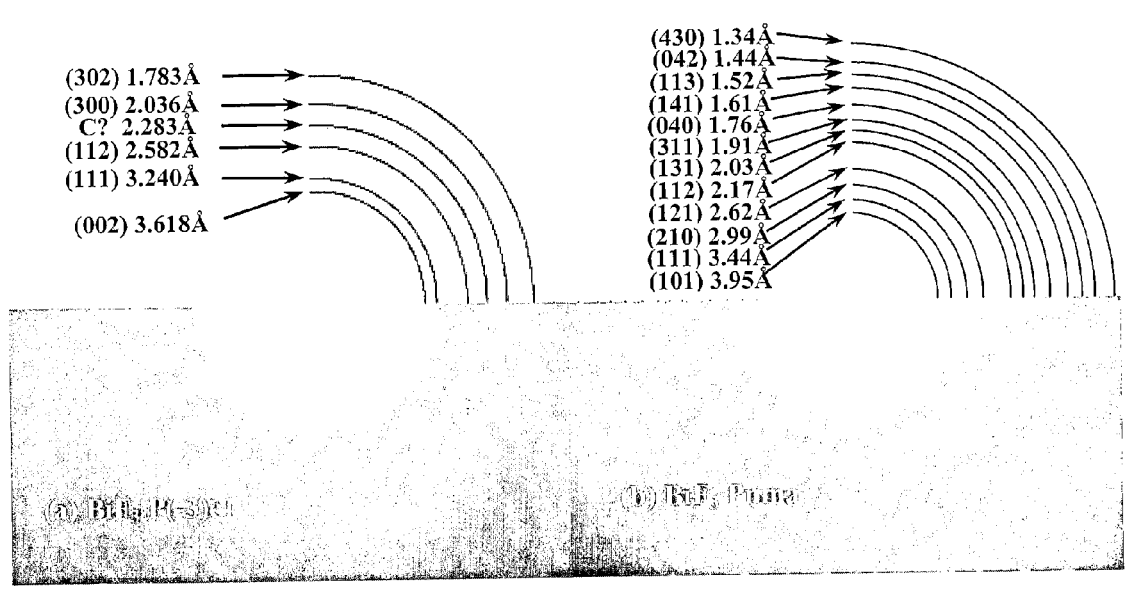
FIG. 2. Selected Area Electron Diffraction (SAED) on the BiF$_3$/C nanocomposite high-energy milled for one hour.

The electron diffraction patterns resulting from SAED can be seen in FIG. 2 after one hour of high-energy milling. Each pattern collected could be indexed either as the pure tysonite phase (pattern a) or the pure orthorhombic phase (pattern b). Mixtures of both tysonite the tysonite phase and the orthorhombic phase were not observed.

Example 4

Figure 3:
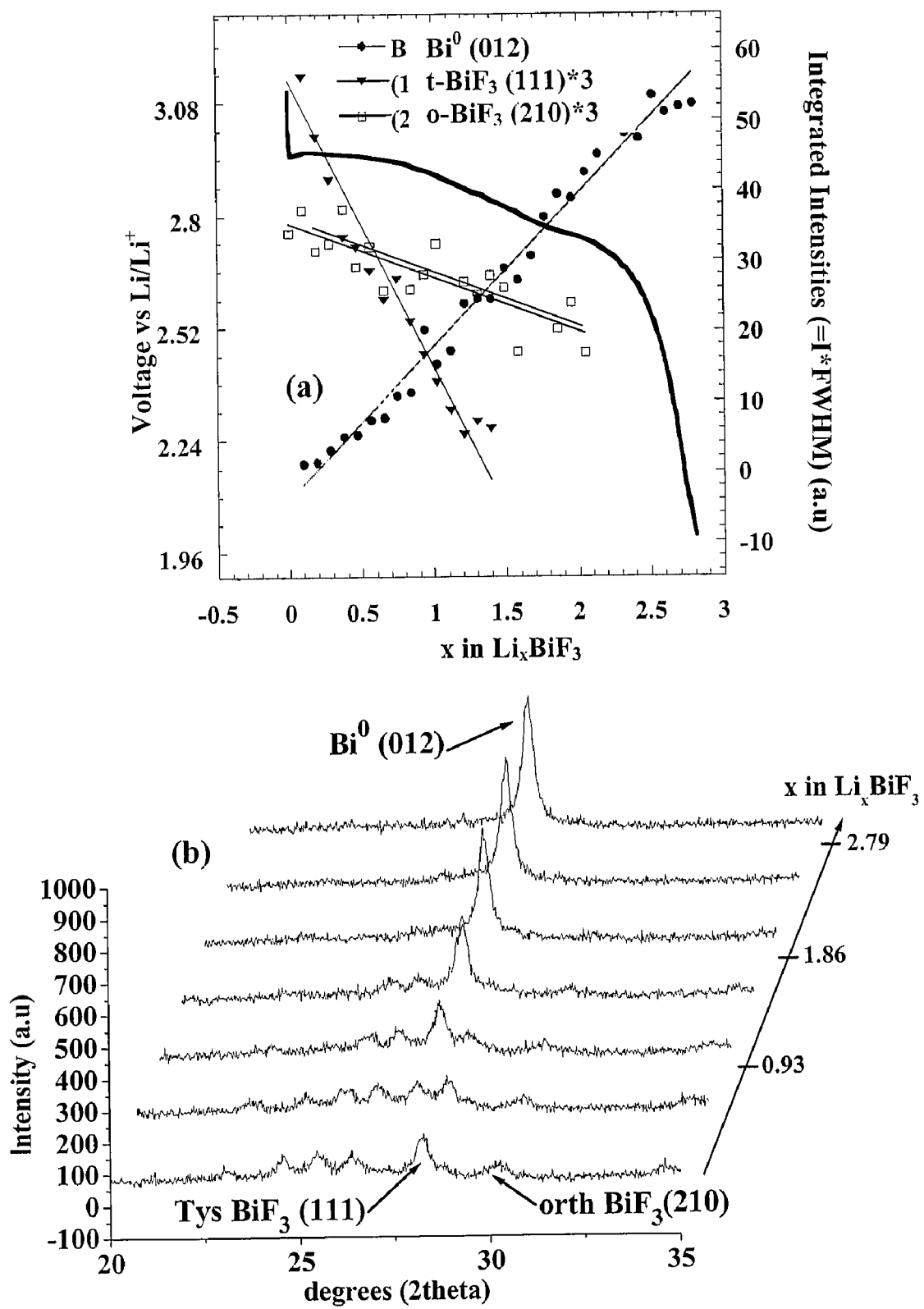
FIG. 3. In-situ XRD of the tysonite BiF$_3$/C nanocomposite during the first lithiation.
Figure 4:
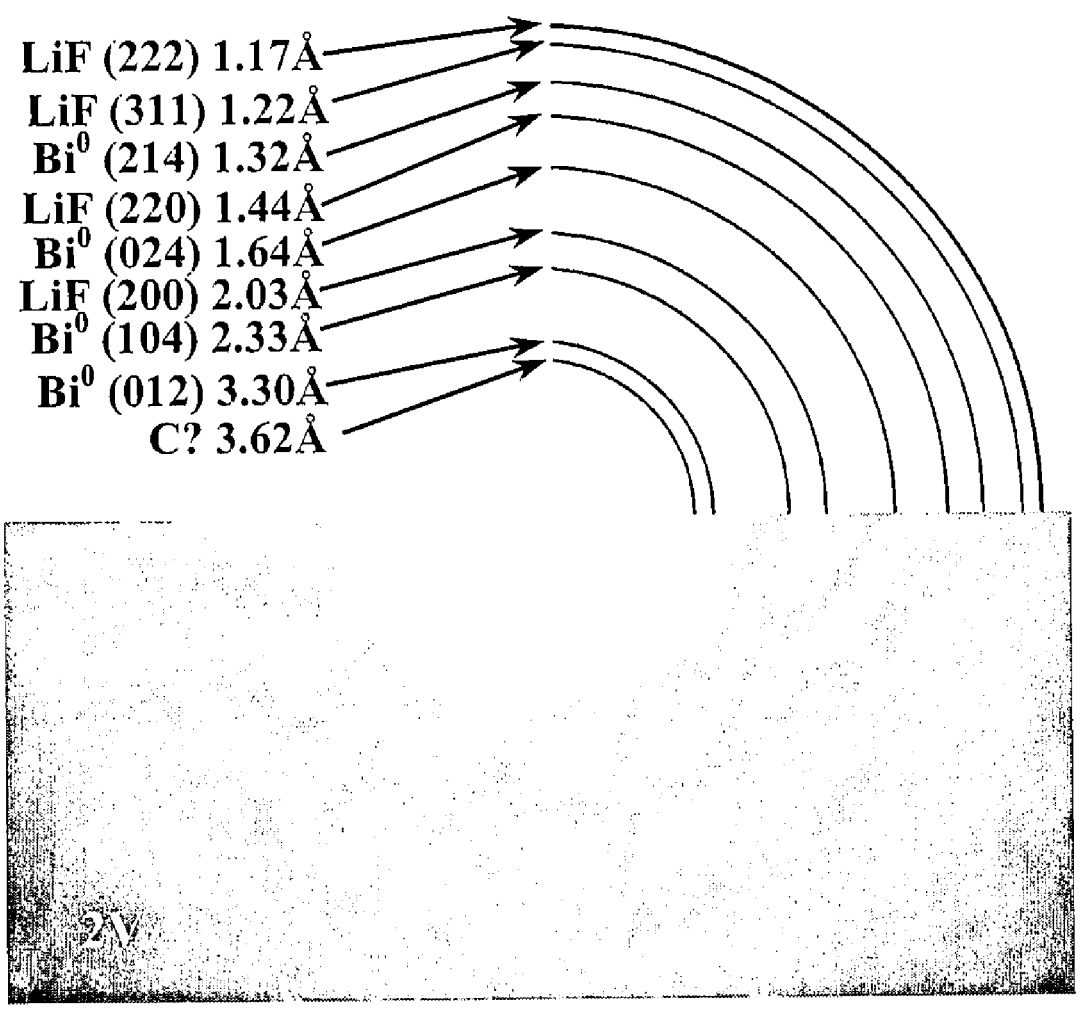
FIG. 4. SAED on the BiF$_3$/C nanocomposite high-energy milled for one hour and lithiated down to 2V vs Li/Li$^+$ at a current density of 7.58 mA/g in a LiPF$_6$ EC:PC:DEC:DMC electrolyte.

In situ XRD Reveals that the Tysonite and Orthorhombic $BiF_3$ Nanocomposites are Capable of a Conversion Reaction Upon Lithiation A galvanostatic discharge curve and XRD patterns, obtained during in-situ XRD conducted on the $BiF_3/C$ nanocomposite high-energy milled for one hour during a first lithiation down to 2V vs Li/Li$^+$, are presented in FIGS. 3(a) and (b), respectively. The corresponding SAED pattern of this inventive nanocomposite is depicted in FIG. 4. Without being bound by theory, the progressive appearance of the Bi$^0$ Bragg's reflections, and the disappearance of the BiF$_3$ Bragg's reflections from the XRD patterns when x in "Li$_x$BiF$_3$" increases, demonstrates that a conversion reaction is taking place in the BiF$_3$/C nanocomposite during the lithiation (FIG. 3b), according to the equation:

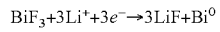

$$BiF_3 + 3Li^+ + 3e^- \rightarrow 3LiF + Bi^0$$

The Bi$^0$ Bragg's reflections become visible at a very early stage of the lithiation, at an x in "Li$_x$BiF$_3$" smaller than 0.1, while the BiF$_3$ reflections do not exhibit any shift, indicating that the conversion reaction starts from the very beginning of the lithiation and that there is no concomitant intercalation reaction of the lithium in the metal fluoride. The LiF Bragg's reflections cannot be observed on these patterns because (1) they are overlapped by the Bi$^0$ reflections, and (2) the x-ray scattering factors of Li and F are much smaller than the x-ray scattering factor of Bi$^0$. As the intensities in such an in-situ experiment are low, those peaks cannot be resolved.

However, LiF clearly forms during the lithiation. The presence of LiF was confirmed by SAED, as shown on the pattern of FIG. 4. In addition to the Bi$^0$ and LiF rings, this pattern features a ring that can be attributed either to the (002) reflection from the tysonite BiF$_3$ or to the carbon matrix. It is not surprising that some residual BiF$_3$ remains in the nanocomposite at this stage, since the x at 2 V is at about 2.8. X must be equal to 3 to fully reduce the metal fluoride. The evolution of the integrated intensities with x of the Bi$^0$ (012) Bragg's reflection, Bragg's reflection from the tysonite BiF$_3$ phase (111) Bragg reflection from and from the orthorhombic BiF$_3$ phase (210) were overlaid onto the galvanostatic curve of FIG. 3(a). The integrated intensity of the Bi$^0$ (012) reflection increased continuously when x increased, indicating that the completion of the conversion reaction progressed linearly with x, as expected.

From the evolution of the integrated intensities of the two BiF$_3$ Bragg's reflections, it can be inferred that the conversion reaction occurs preferentially in the tysonite phase rather than in the orthorhombic phase. The integrated intensity of the (111) tysonite BiF$_3$ peak has a greater negative slope and therefore decreased faster with x than the integrated intensity of the (210) peak from the orthorhombic BiF$_3$ phase. At an x in "Li$_x$BiF$_3$" of about 1.8, only the peaks from the orthorhombic phase can be seen.

Although the conversion reaction takes place preferentially in the tysonite BiF$_3$ phase, it is clear nonetheless that it also occurs in the orthorhombic phase. This is demonstrated in FIG. 5. This figure depicts an in situ XRD analysis (LiPF$_6$ EC:DMC electrolyte 1:1 ratio by volume) and current density of 7.58 mA/g conducted on an orthorhombic BiF$_3$/C nanocomposite. This orthorhombic BiF$_3$/C nanocomposite was prepared by an HF treatment on the BiF$_3$/C nanocomposite, high-energy milled for one hour.

Figure 5:
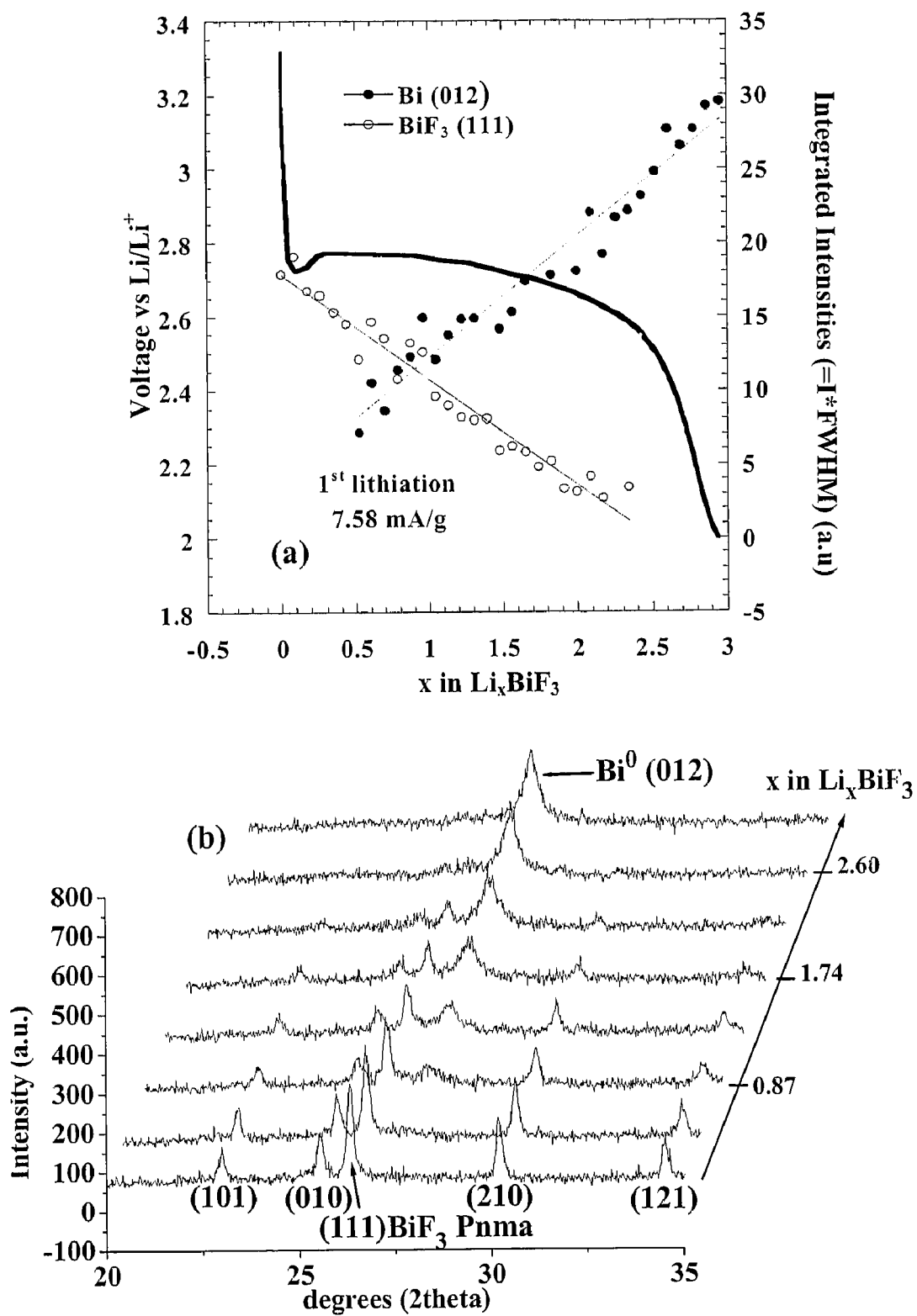
FIG. 5. In-situ XRD of the o-BiF$_3$/C nanocomposite during the first lithiation (a) galvanostatic curve with integrated intensities of the Bi$^0$ (012) and BiF$_3$ orthorhombic (111) peaks and (b) XRD patterns.

FIG. 5 is divided into two parts: part (a) describes the variation with x of the output voltage of the integrated intensities of the Bi$^0$ (012) and the orthorhombic BiF$_3$ (111) Bragg's reflections and part (b) depicts the in-situ XRD patterns. The patterns reveal the progressive increase of the Bi$^0$ XRD peaks and the progressive decrease of the BiF$_3$ peaks, as expected from a typical conversion reaction. In both FIGS. 3 and 5, the orthorhombic BiF$_3$ Bragg reflections at (210) remain visible until a much more advanced state of completion of the conversion reaction than do the tysonite BiF$_3$ reflections at (111). Although both nanocomposites have crystallite sizes of about 30 nm, the tysonite BiF$_3$/C nanocomposite, high energy milled for one hour, has a wider size distribution of particles, 30 nm being the upper limit of the distribution. Alternatively, the size of the particles of the orthorhombic nanocomposite are more homogeneous. Because, on average, the crystallite size is larger in the orthorhombic BiF$_3$/C nanocomposite, the orthorhombic phase may remain visible by XRD for a deeper lithiation. (See, e.g., M. Berves, *Dissertation*, Rutgers, New Jersey, 2005, which is herein incorporated by reference.)

Example 5

Mechanism of Lithium Transport

Figure 6:
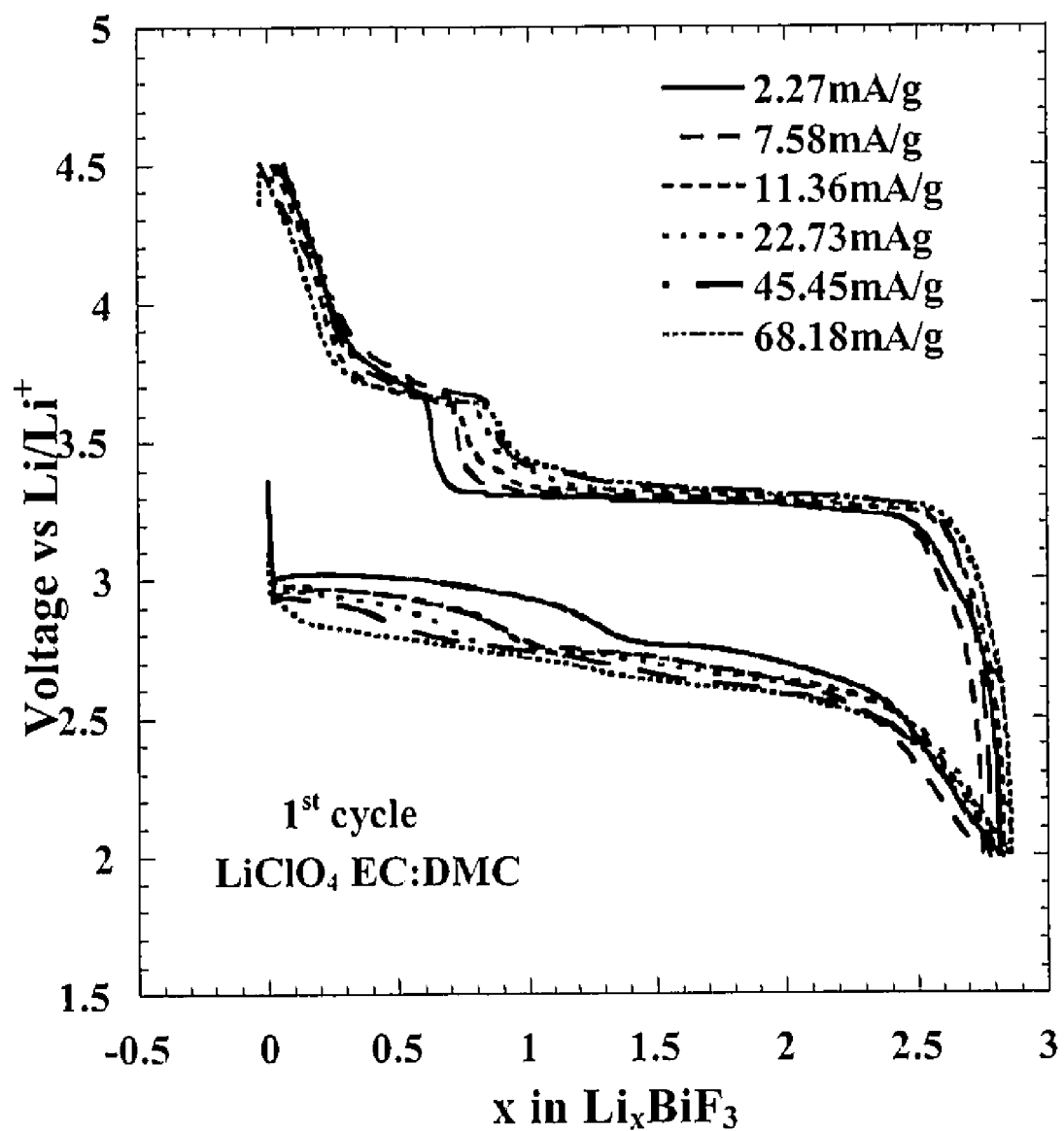
FIG. 6. First cycle of the BiF$_3$/C nanocomposite at different current densities.

The Conversion Reaction for Tysonite BiF$_3$ Nanocomposite is Associated with Two Voltage Plateaus FIG. 6 depicts the first cycle of the tysonite BiF$_3$/C nanocomposite (4 hours energy-milled) at different current densities in a LiClO4 EC:DMC 0.4 M electrolyte (1:1 by volume). A separation of two pseudo-plateaus occurs on the voltage profile for this nanocomposite (2.9 voltage vs Li/Li+ and 2.75 voltage vs Li/Li+) during discharge.

Because from a thermodynamics standpoint, a conversion reaction is a two-phase reaction, this reaction should have a very flat output voltage. And indeed, the lithiation output voltage after relaxation is perfectly flat as shown on the galvanostatic intermittent titration technique (GITT) curves of the tysonite BiF$_3$ and orthorhombic BiF$_3$ nanocomposites, (FIGS. 7 and 8, respectively), thus demonstrating that the occurrence of voltage plateaus during lithiation is due to kinetic effects.

If the occurrence of these two plateaus during the lithiation is due to kinetic effects, the kinetics that develop the pseudo-plateaus are most likely associated with different electronic and ionic transport mechanisms of the different phases present at the different stages of the lithiation reaction. Without being limited by theory, one plateau should be associated with the lithiation reactant (BiF$_3$) and the other should be associated with the products (LiF and Bi$^0$).

Figure 7:
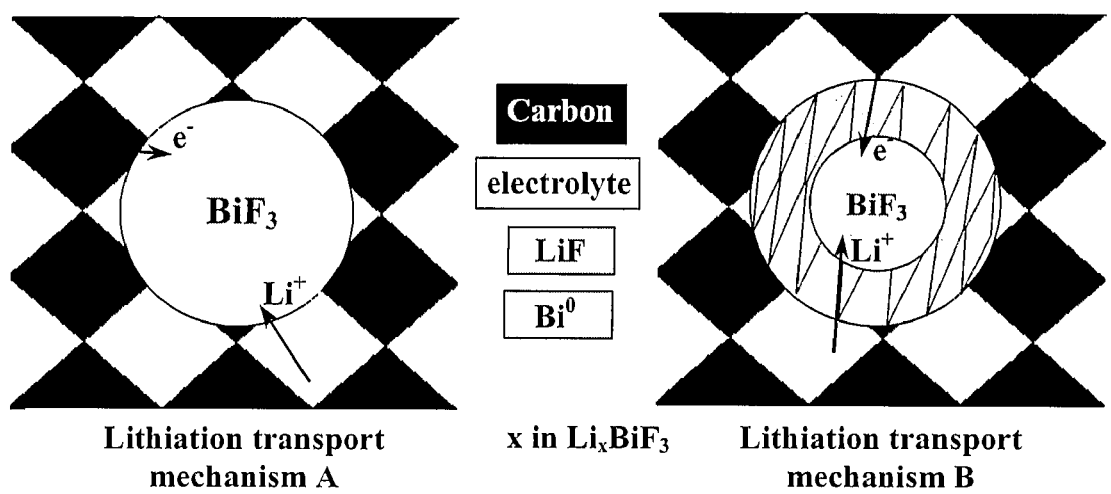
FIG. 7. Schematics of the two different transport mechanisms suggested for lithiation.

Without being limited by theory, schematics of the two suggested lithiation transport mechanisms are provided in FIG. 7. At the beginning of the lithiation, the nanocomposite is composed of BiF$_3$ nanoparticles surrounded by a carbon matrix. Owing to the extremely high porosity of the carbon matrix, the bismuth fluoride particles are in direct contact with the electrolyte, enabling facile ionic transport. At that early stage of the reaction, the electrons are transferred to the BiF$_3$ surface via the carbon matrix and the Li$^+$ ions migrate to the BiF$_3$ surface directly from the electrolyte, inducing the surface conversion into Bi$^0$ and LiF (transport mechanism A on FIG. 7). After a certain degree of completion of the conversion reaction, the entire surface of the BiF$_3$ particles will have reacted. The point at which this occurs is dependent on the specific surface area of the bismuth fluoride. The nanocomposite then is composed of BiF$_3$ crystallites of only a few nanometers surrounded by the conversion reaction products, Bi$^0$ and LiF, and no longer by the carbon matrix. At this point, the transport mechanisms will change dramatically as Li$^+$ ion diffusion will take place through the defect boundaries of the LiF and Bi$^0$ nanoparticles. Electrons then will be transferred to the core BiF$_3$ via percolation of metal Bi$^0$ (transport mechanism B on FIG. 7). Such dramatic differences in transport mechanisms can justify a dramatic polarization change, leading to the occurrence of these two pseudo-plateaus during the lithiation.

Example 6

Galvanostatic Curves and In Situ XRD Reveals that the Tysonite BiF$_3$ Nanocomposite is Capable of a Reversible Conversion Reaction A galvanostatic curve and in-situ XRD patterns were collected oil the first delithiation of the tysonite BiF$_3$/C nanocomposite to assess whether or not this nanocomposite was capable of a reversible conversion reaction. The voltage curve and XRD patterns are presented, respectively, in FIGS. 10(*a*) and (*b*). These analyses were conducted by first lithiating a disc containing the inventive tysonite nanocomposite (see Example 1 for electrode preparation) to 2V at a current density of 45.45 mA/g in an in-situ cell without an X-ray. The cycling was stopped at the end of the lithiation and one XRD pattern was collected. The same in-situ cell was then delithiated until x in Li$_x$BiF$_3$ was at about 1.55, at a current density of 45.45 mA/g, without an X-ray, before the start of the actual in-situ XRD. After two hours, in-situ XRD was initiated using a current density of 7.58 mA/g and LiPF$_6$ EC:DMC (1:1 ratio by volume) as the electrolyte.

Figure 8:
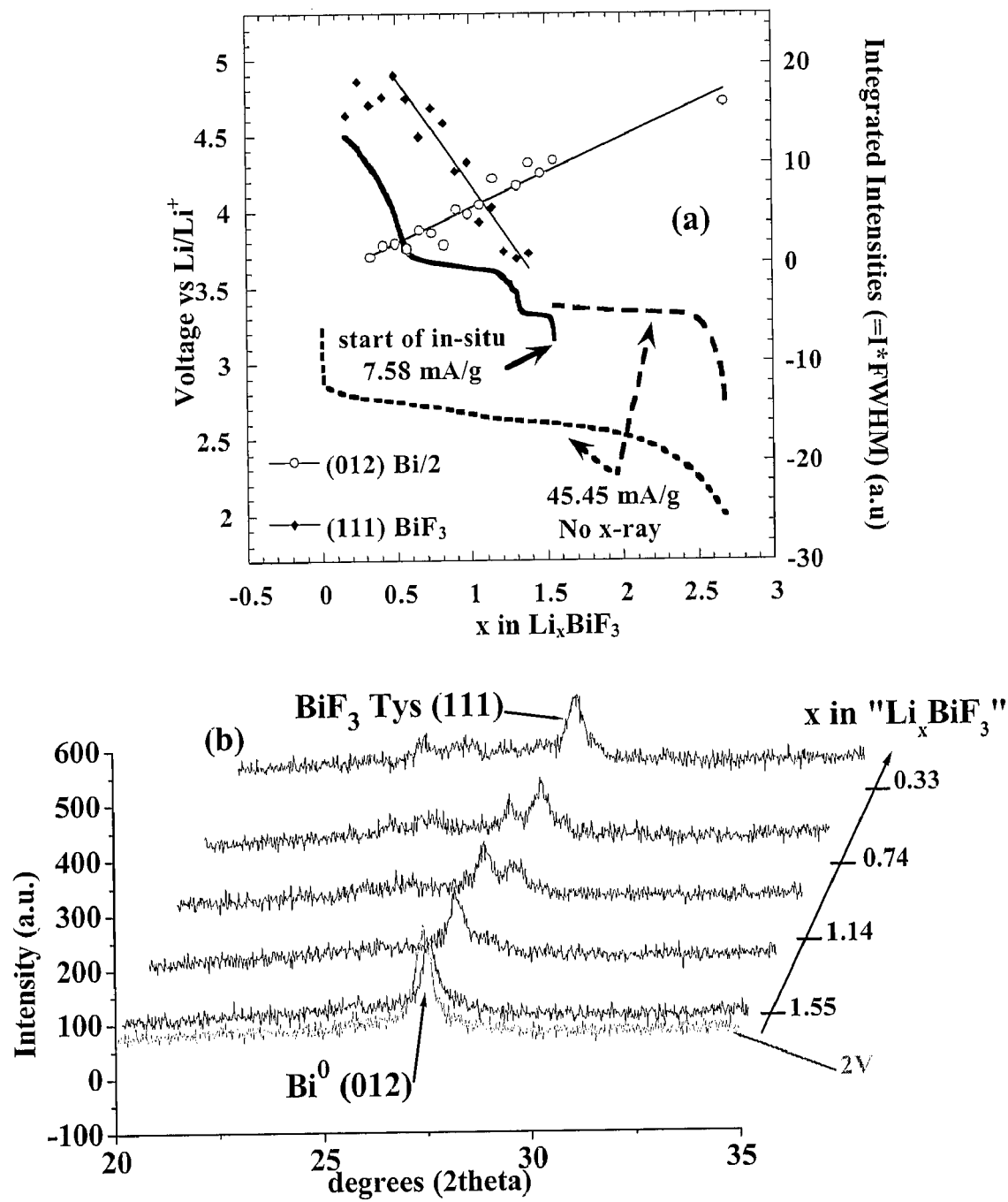
FIG. 8. In-situ XRD of the tysonite BiF$_3$/C nanocomposite during the first delithiation (a) galvanostatic curve with integrated intensities of the Bi$^0$ (012) and Tysonite BiF$_3$ (111) peaks and (b) XRD patterns.

FIG. 8(*b*) shows the XRD patterns obtained. These patterns depict the reformation of tysonite BiF$_3$ during delithiation, thus revealing that the conversion reaction is reversible. Without being limited by theory, the overall chemical reaction for this inventive tysonite BiF$_3$ nanocomposite is:

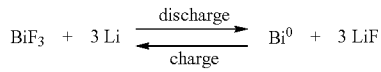

Figure 9:
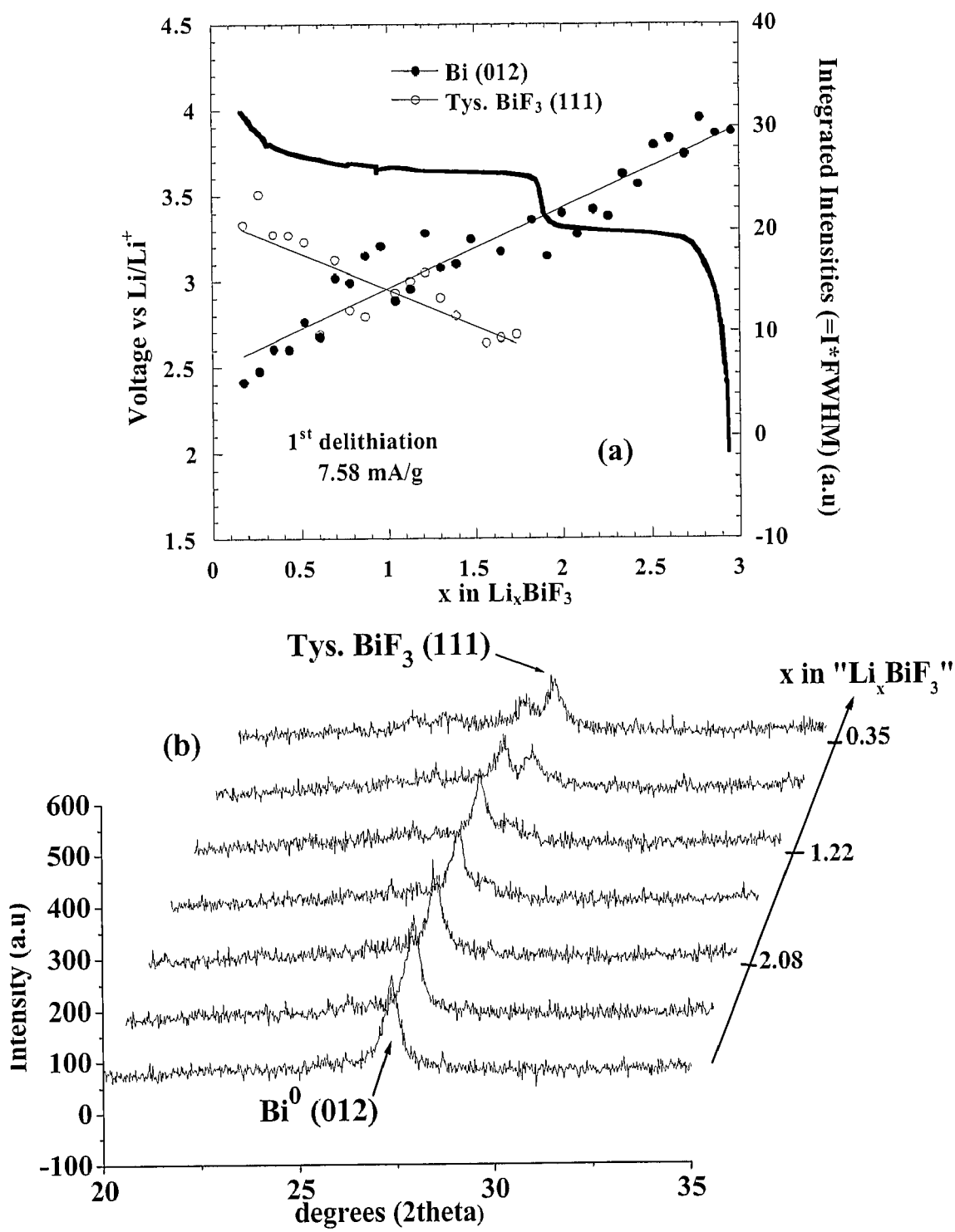
FIG. 9. In-situ XRD of the o-BiF$_3$/C nanocomposite during the first delithiation (a) galvanostatic curve with integrated intensities of the Bi$^0$(012) and BiF$_3$ Tysonite (111) peaks and (b) XRD patterns.

In contrast to the reversibility of the conversion reaction seen for tysonite BiF$_3$, galvanostic curves and in-situ XRD patterns shown in FIGS. 11*a* and 11*b*, respectively, reveal that the orthorhombic BiF$_3$ is not reversible. As seen in the in-situ XRD of the orthorhombic BiF$_3$ in FIG. 9*a*, only the tysonite BiF$_3$ forms during the delithiation, even when the starting material is the pure orthorhombic BiF$_3$/C nanocomposite.

Example 7

Proposed Mechanism of the Reversible Conversion Reaction a. XRD Analysis Reveals Two Voltage Plateaus FIG. 8(*b*) also reveals that the BiF$_3$ Bragg's reflections begin to be visible only at an advanced state of completion of the delithiation, at an x in "Li$_x$BiF$_3$" on the order of 1.3. As can be seen on FIG. 8(*a*), this x value is almost precisely the x value at which a first delithiation plateau ends and the voltage increases sharply before reaching a second plateau at 3.7 V. Hence, based on the XRD results, and without being limited by theory, it would seem that the only bismuth compound present in the nanocomposite along this first plateau is Bi$^0$ and that the actual reconversion reaction begins on the second plateau at higher voltage. However, as the first delithiation plateau covers approximately two thirds of the delithiation, and the capacity on the second discharge is almost identical to the capacity on the first discharge, there can nevertheless be no doubt that some, if not the majority, of the reversibility comes from the first plateau. Furthermore, as seen in FIGS. 10(*a*) and 11(*a*), the integrated intensity of the (012) Bi$^0$ Bragg's reflection clearly decreases along the first delithiation plateau, indicating that the amount of Bi$^0$ in the material decreases continuously along this 3.3V plateau.

Figure 10:
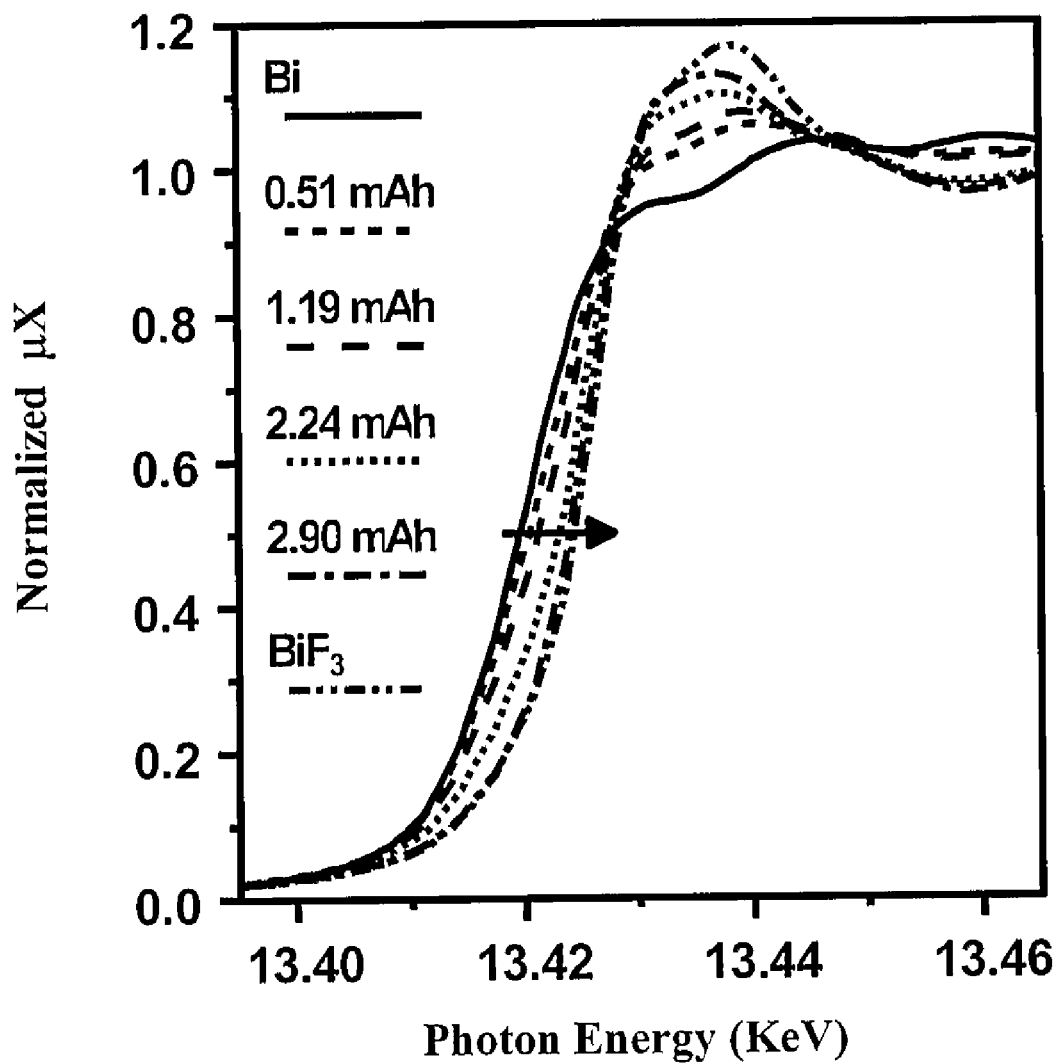
FIG. 10. X-ray Absorption Near Edge Spectra (XANES) data collected during the first cycle of charging a discharged BiF$_3$ cathode at 0.25 mA (as a function of state of charge).

The sudden polarization increase leading to the second plateau occurs at an earlier stage of delithiation in the orthorhombic BiF$_3$/C nanocomposite than in the tysonite BiF$_3$ nanocomposite, as evident from comparison of FIGS. 10(*a*) and 11(*a*). As mentioned earlier, the average BiF$_3$ crystallite size is larger in the orthorhombic BiF$_3$/C nanocomposite than in the tysonite BiF$_3$ nanocomposite. This means that (i) the size of the (LiF+Bi$^0$) aggregates at the end of the lithiation will also be larger in the orthorhombic BiF$_3$/C nanocomposite than in the tysonite BiF$_3$ nanocomposite, and (ii) the surface over volume ratio thus will be smaller in the former than in the latter. Without being bound by theory, during the delithiation reaction, the surface of (LiF+Bi$^0$) aggregates therefore will become covered by the BiF$_3$ layer at an earlier stage of the conversion reaction and the polarization increase, brought about by the formation of this layer, and the resulting transition from a first transport mechanism to a second transport mechanism, will happen earlier. (See below for FIG. regarding transport mechanisms).

b. Bi$^0$ is Oxidized to Bi$^{3+}$ in BiF$_3$ at the First Plateau

Without being bound by theory and in order to provide a fundamental understanding of the origin of the redox reaction on the first delithiation plateau, x-ray absorption spectroscopy (XAS) was used to monitor the evolution of the electronic and atomic structure of Bi under in situ conditions. The discharge and charge capacities are summarized in Table 1. The cell was discharged and charged within the potential range of 2.0-4.5V vs. Li/Li$^+$. The x-ray absorption near edge structure (XANES) data, collected during the first cycle of charging, are shown in FIG. 10 as a function of state of charge and versus Bi$^o$ and Bi$^{3+}$F$_3$ standards. The data demonstrate the direct oxidation of metallic Bi$^0$ to Bi$^{3+}$ in BiF$_3$ during the charging of a discharged BiF$_3$ cathode. Structurally, this conclusion is also supported by the Fourier transform X-ray Absorption Fine Structure (EXAFS) data displayed in FIG. 11 as a function of state of charge, along with data shown for metallic Bi and BiF$_3$ as reference standards for Bi$^0$ and Bi$^{3+}$.

TABLE 1

Summary of discharge and charge capacities for the Li/BiF$_3$ cell used for the in-situ XAS.

| Cycle | Current (mA) | Time (hr) | Capacity (mAh) |
|---|---|---|---|
| 1st discharge | 0.20 | 14.083 | 2.82 |
| 1st charge | 0.25 | 11.639 | 2.91 |
| 2nd discharge | 0.25 | 10.472 | 2.62 |
| 2nd charge | 0.25 | 11.472 | 2.87 |

Figure 11:
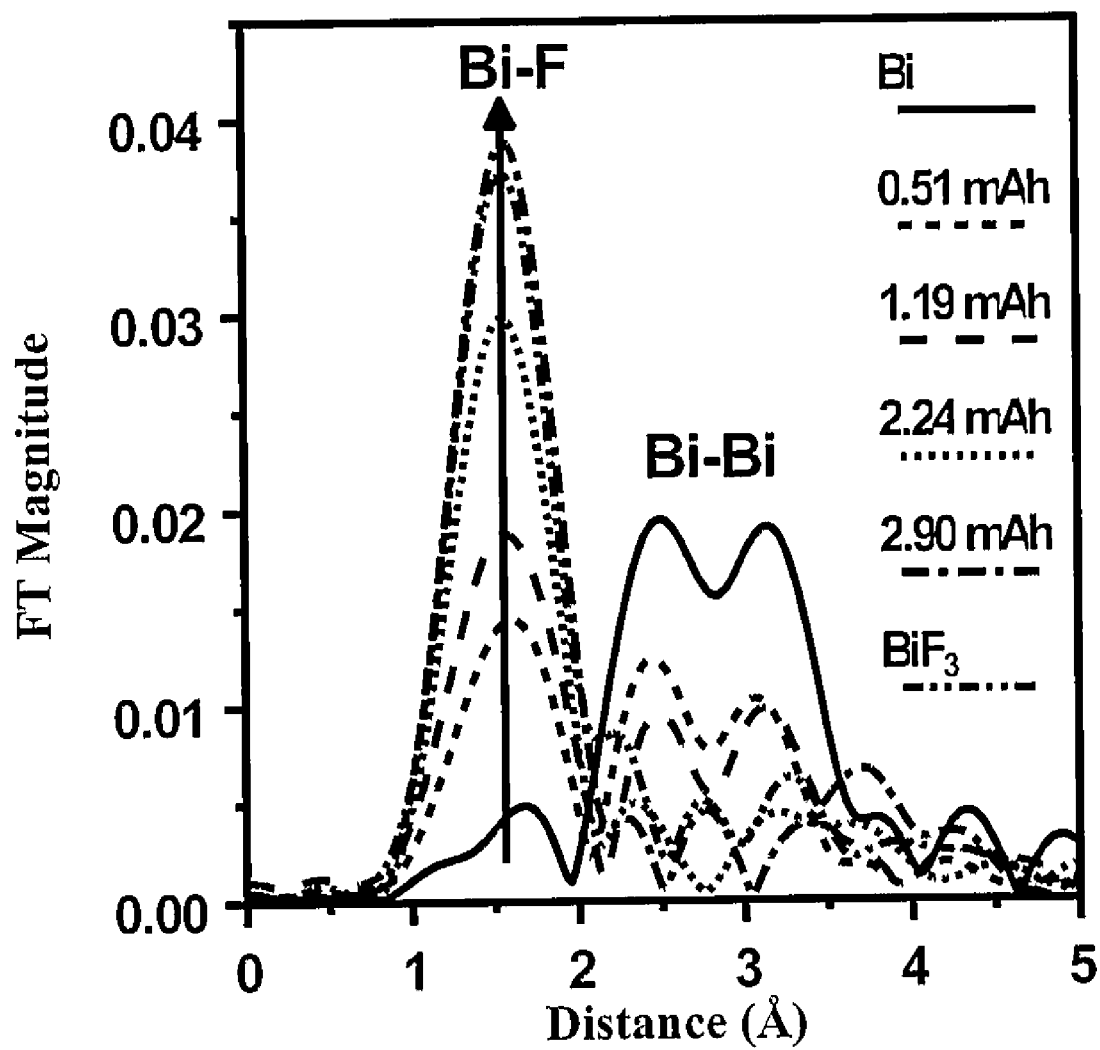
FIG. 11. Phase-uncorrected Fourier transforms of k$^3$-weighted X-ray Absorption Fine Structure (EXAFS) data collected during the first cycle of charging a fully discharged BiF$_3$ cathode at 0.25 mA (as a function of state of charge).

The Fourier transform of EXAFS data for metallic Bi in FIG. 11 displays a doublet at 2.499 Å and 3.148 Å, which corresponds to contributions from 3 Bi atoms at a crystallographic distance of 3.073 Å and 3 Bi atoms at 3.527 Å, respectively. The Fourier transform of BiF$_3$, on the other hand, displays mainly a single peak at 1.549 Å, which corresponds to contributions from eight F atoms. For the discharged cathode, as expected, the Fourier transform mainly shows the presence of metallic Bi. During charge, the Fourier transforms display both the Bi—F and Bi—Bi contributions: the Bi—F contribution increases and the Bi—Bi contribution decreases with the state of charge in a distinct two phase manner. Finally, the Fourier transform for the charged cathode is consistent with that of BiF$_3$. These analyses, therefore, reveal that there is no intermediate bismuth fluoride compound forming, in which the oxidation state of the bismuth is lower than 3.

c. Tysonite $BiF_3$ is Reformed at the First Plateau

Figure 12:
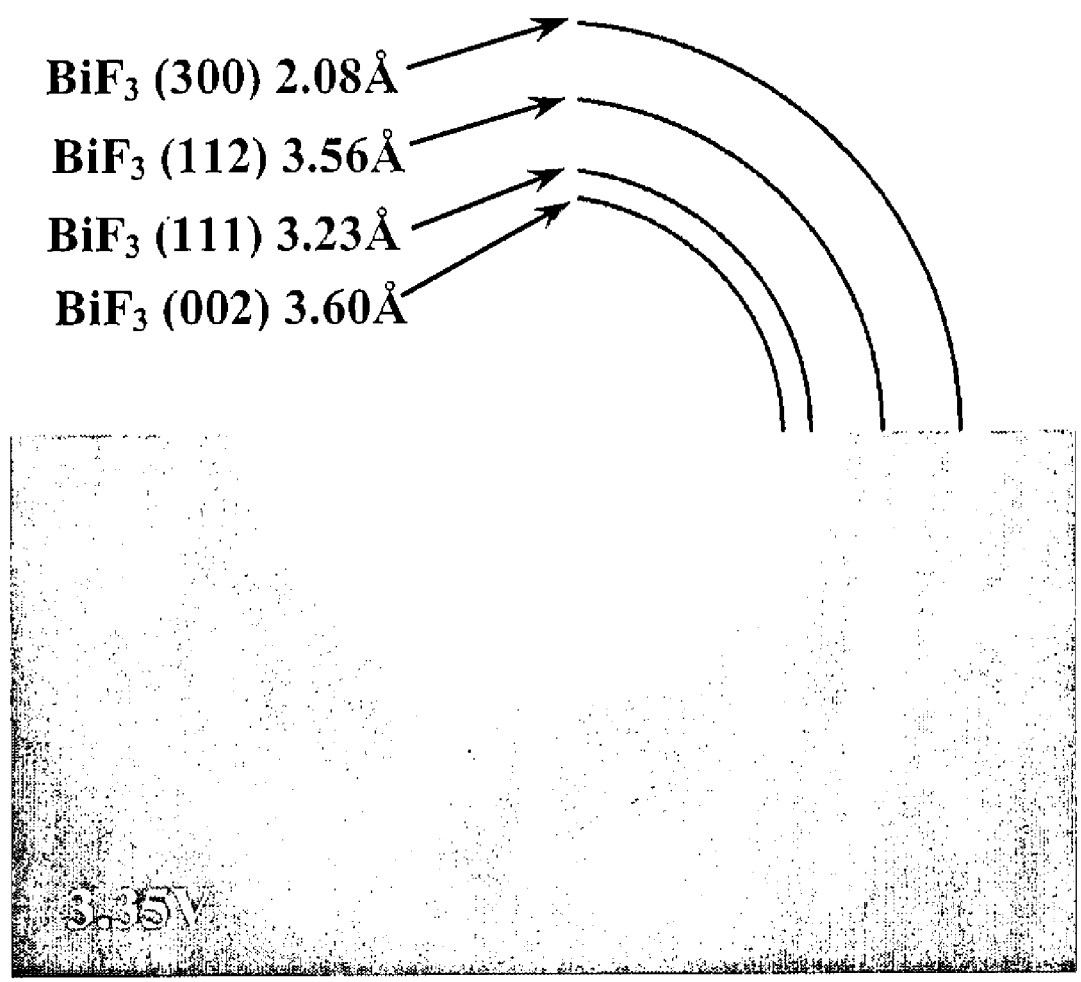
FIG. 12. SAED on the BiF$_3$/C nanocomposite high-energy milled for one hour and delithiated to 3.35V vs Li/Li$^+$ after a first lithiation at 2V.

FIG. 12 depicts SAED patterns of the $BiF_3$/C nanocomposite high-energy milled for one hour and then delithiated to 3.35 vs Li/Li+ after a first delithiation at 2 V using a current density of 7.581 mA/g and an $LiPF_6$ EC:PC:DEC:DMC (1:1 ratio by volume) electrolyte. All the diffraction rings of this pattern were indexed on the basis of the $BiF_3$ tysonite structure. Hence, this SAED analysis confirms the presence of reformed tysonite $BiF_3$ along the first delithiation plateau. Without being limited by theory, it is possible to reconcile the in-situ XRD data, on which the reconverted $BiF_3$ can be seen only on the second plateau at higher voltage, and the SAED and in-situ XAS data, which shows that $BiF_3$ does indeed reform on the first plateau as well. It appears that the primary crystallite size of the reconverted $BiF_3$ on the first delithiation plateau is too small to be resolved by XRD. Without being limited by theory, similar to the situation resolved during lithiation, the separation of the delithiation voltage profile in two plateaus at about 3.3 V and 3.7V is a pure kinetic effect and is due to a polarization increase.

Figure 13:
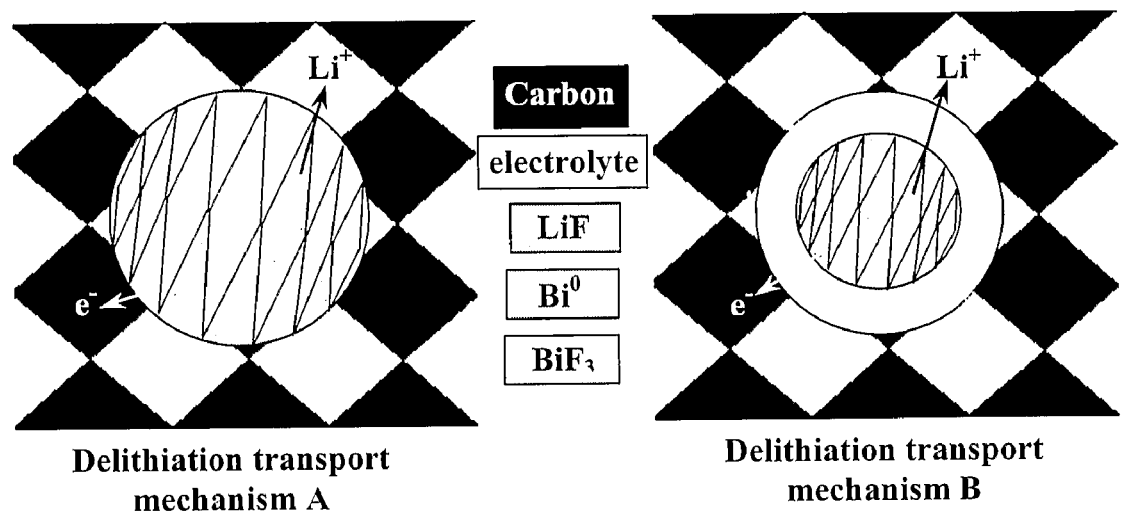
FIG. 13. Schematics of the two different transport mechanisms suggested for delithiation.

Analogous to what we have proposed for the lithiation reaction, the division of the delithiation reaction into two plateaus, attributable to kinetics effects, can be understood in terms of transport mechanisms. Without being limited by theory, schematics of the two proposed transport mechanisms for the delithiation are depicted in FIG. 13. At the end of the lithiation, what were the $BiF_3$ nanoparticles in the initial nanocomposite are now aggregates of very fine $Bi^0$ and LiF nanoparticles arranged in a shell. When the oxidation reaction commences, $Li^+$ ions diffuse from the LiF nanoparticles near the surface of the aggregates directly into the electrolyte, and electrons are transferred from the $Bi^0$ nanoparticles near the surface of the (LiF+$Bi^0$) aggregates directly to the carbon matrix, inducing the oxidation of the bismuth metal into $BiF_3$ (transport mechanism A in FIG. 13). The kinetic hindrances for those electronic and ionic transport mechanisms are small and, therefore, the polarization is small (less than 0.1V according to the GITT plot of FIG. 7) resulting in a plateau at 3.3 V vs $Li/Li^+$. After a while, the surface has been fully oxidized and all the (LiF+$Bi^0$) aggregates are covered with an electron insulative $BiF_3$ product layer. The electronic and ionic transport mechanisms change, going from what we called mechanism A to mechanism B. In the proposed transport mechanism, the electrons have to tunnel from the remaining $Bi^0$ nanoparticles at the core of the aggregates to the carbon matrix through the $BiF_3$ layer. Likewise, $Li^+$ ions have to diffuse through this $BiF_3$ layer, migrating from the remaining LiF nanoparticles at the core of the aggregate to the electrolyte. Obviously, the kinetic hindrances are much more severe in mechanism B than they were in mechanism A, and the polarization increases suddenly and significantly (by about 0.3V according to the GITT curve of FIG. 7), the output voltage then entering the second plateau at 3.7V. Since this transition is due to the formation of a (proportionally) thick $BiF_3$ layer on the surface of the (LiF+$Bi^0$) aggregates, this also explains why the $BiF_3$ only becomes visible by XRD at the second delithiation plateau.

Figure 14:
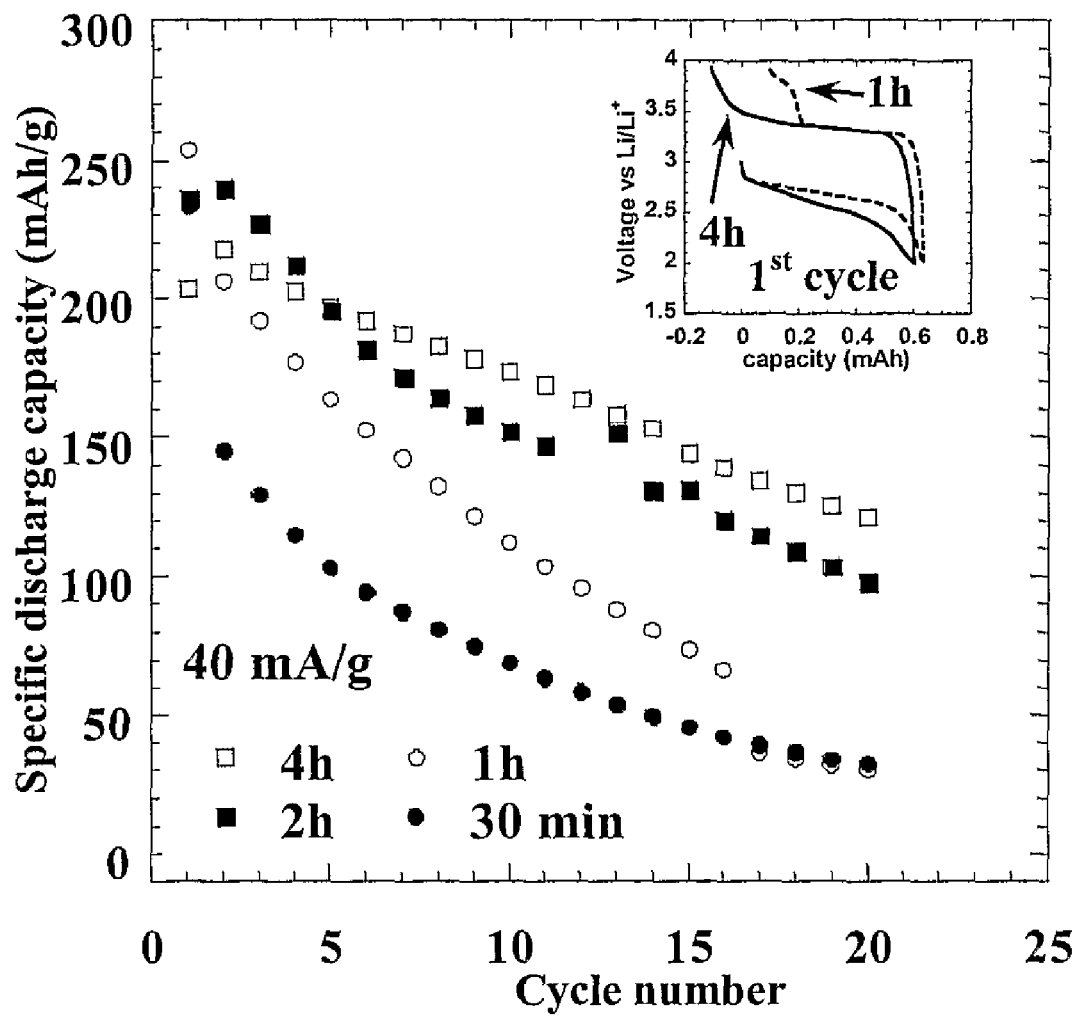
FIG. 14. Specific discharge capacities versus cycle numbers for the BiF$_3$/C nanocomposite high-energy milled for 30 min, 1 h, 2 h and 4 h.

The specific discharge capacity versus cycle number plot of tysonite $BiF_3$/C nanocomposite high-energy milled for 30 min, 1 h, 2 h and 4 h and cycled between 2V and 4V at a current density of 40 mA/g in a $LiPF_6$ EC:PC:DEC:DMC electrolyte is presented in FIG. 14. This figure shows that cycling stability improves when the milling time is increased. Although from the XRD patterns shown on FIG. 1 the $BiF_3$ crystallite size does not seem to decrease much when the milling time is increased, the distribution of crystallite size is probably different. Hence, the longer the milling time, the more the nanocomposite will have $BiF_3$ crystallites of extremely small dimensions and the less the nanocomposite will have 30 nm $BiF_3$ crystallites. Without being limited by theory, if the average particle size gets smaller when the high-energy milling time is increased, the surface over volume ratio of the $BiF_3$ particles will become larger, and thus the transition from the transport mechanism A to the transport mechanism B during the delithiation will occur later. Without being limited by theory, this would explain why, as can be seen in the inset of the FIG. 14, the tysonite $BiF_3$/C nanocomposite high-energy milled for 4 h does not exhibit the second plateau at 3.7V during the delithiation. The smaller average crystallite size also may justify the improved capacity retention when the milling time is increased.

Example 8

The Effect of $MoO_3$ on Specific Capacity in a Bismuth Fluoride Nanocomposite

Figure 15:
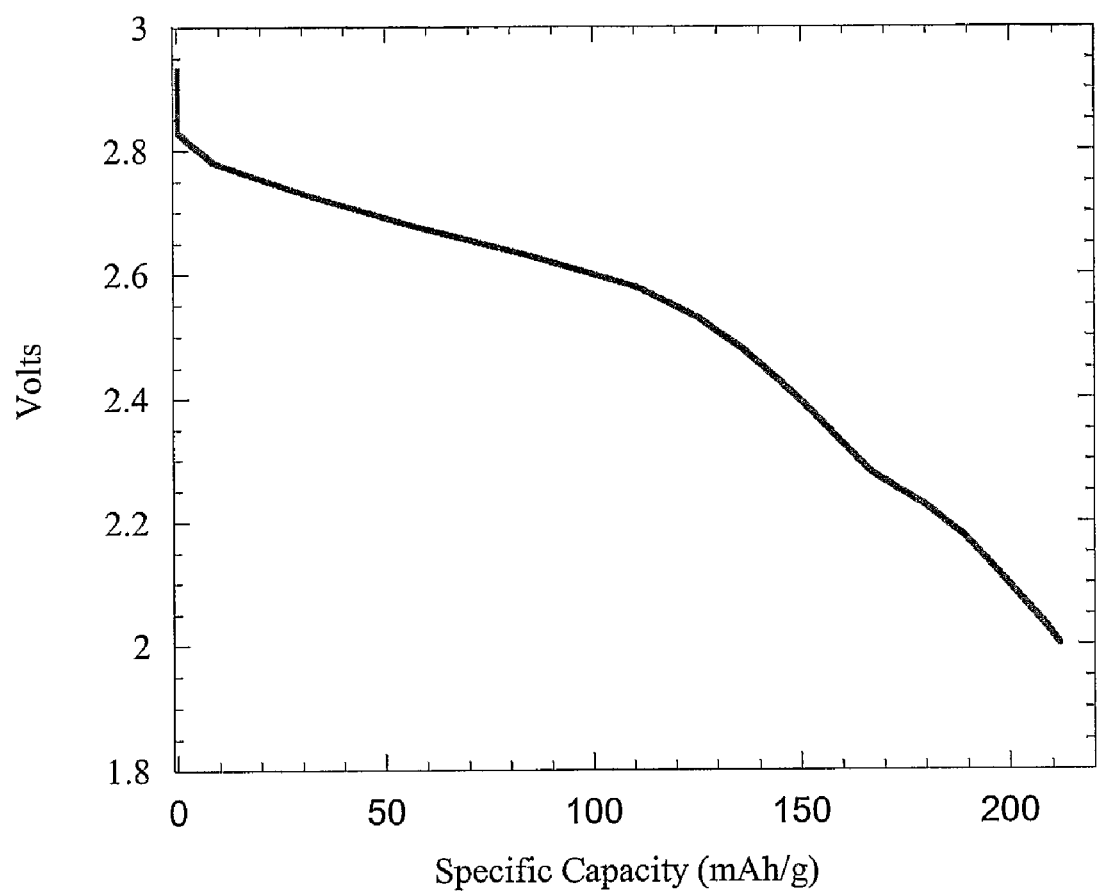
FIG. 15. The effect of MoO$_3$ on specific capacity in a bismuth fluoride nanocomposite.

An $MoO_3$ bismuth fluoride nanocomposite was fabricated by incorporating 15 weight % $MoO_3$ and 85 weight percent $BiF_3$. The resultant inventive nanocomposite was of the formula $Bi_{0.85}Mo_{0.15}O_{0.45}F_{2.55}$. The nanocomposite was formed by high energy milling the mixture for two hours. The material was tested versus a Li metal counter electrode at 40 mA/g discharge current. FIG. 15 depicts voltage versus specific capacity. As can be seen from the figure, at 2 Volts the specific capacity is greater than 200 mAh/g.

While the present invention has been described with reference to the specific embodiments thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present invention. All such modifications are intended to be within the scope of the claims appended hereto.

What is claimed is:

1. A positive electrode composition comprising a nanocrystalline bismuth fluoride compound, wherein the bismuth fluoride compound comprises $Bi^{+3}$, and wherein the maximum energy density of the composition is 7170 $Wh/l^{-1}$.

2. The composition according to claim 1, wherein the bismuth fluoride compound comprises a tysonite $BiF_3$ compound.

3. The composition according to claim 1, wherein the bismuth fluoride compound comprises an orthorhombic crystallite $BiF_3$ compound.

4. The composition according to claim 1, wherein the bismuth fluoride compound further comprises a metal cation in partial substitution of the Bi cation.

5. The composition according to claim 4, wherein the metal cation is a metal element selected from the group consisting essentially of Fe, B, Co, Ni, Mn, V, Mo, Pb, Sb, Cu, Sn, Nb, Cr, Ag and Zn.

6. The composition according to claim 4, wherein the metal cation is a metal element selected from the group consisting of Cu and Mo.

7. The composition according to claim 1, wherein the bismuth fluoride compound comprises nanocrystallites that are less than about 100 nm in diameter.

8. The composition according to claim 1, wherein the bismuth fluoride compound comprises nanocrystallites that are less than about 50 nm in diameter.

9. The composition according to claim 1, wherein the bismuth fluoride compound comprises nanocrystallites that are less than about 20 nm in diameter.

10. The composition according to claim 1, wherein the bismuth fluoride compound is $BiF_3$.

11. The composition according to claim 1, further comprising oxygen.

12. The composition according to claim 11, wherein the nanocomposite comprises $BiO_xF_{z-2x}$, wherein $0<x<1.5$ and $3 \leq z \leq 5$.

13. A positive electrode composition comprising a nanocrystalline bismuth fluoride compound nanocomposite, wherein the nanocrystalline bismuth fluoride compound comprises $Bi^{3+}$, and wherein the maximum energy density of the composition is 7170 Wh/l$^{-1}$.

14. The composition according to claim 13, wherein the bismuth fluoride compound of the nanocomposite comprises a tysonite $BiF_3$ compound.

15. The composition according to claim 13, wherein the bismuth fluoride compound of the nanocomposite comprises an orthorhombic crystallite $BiF_3$ compound.

16. The composition according to claim 13, wherein the bismuth fluoride compound further comprises a metal cation in partial substitution of the Bi cation.

17. The composition according to claim 16, wherein the metal cation is a metal element selected from the group consisting essentially of Fe, B, Co, Ni, Mn, V, Mo, Pb, Sb, Cu, Sn, Nb, Cr, Ag and Zn.

18. The composition according to claim 16, wherein the metal cation is a metal element selected from the group consisting of Cu and Mo.

19. The composition according to claim 13, further comprising a conductive matrix.

20. The composition according to claim 19, wherein the conductive matrix is a conductive matrix selected from the group consisting of a metal oxide, a metal fluoride and a metal oxyfluoride.

21. The composition according to claim 20, wherein a metal from the metal oxide, the metal fluoride and the metal oxyfluoride is a metal selected from the group consisting of Fe, B, Bi, Co, Ni, Mn, V, Mo, Pb, Sb, Cu, Sn, Nb, Cr, Ag and Zn.

22. The composition according to claim 19, wherein the conductive matrix is present in an amount that is less than about 50 weight % of the nanocomposite.

23. The composition according to claim 19, wherein the conductive matrix is carbon.

24. The composition according to claim 23, wherein the carbon is in an amount that is less than about 5 weight percent of the nanocomposite.

25. The composition according to claim 13, wherein the bismuth fluoride nanocomposite further comprises carbon.

26. The composition according to claim 25, wherein the carbon is in an amount that is less than about 50 weight percent carbon of the nanocomposite.

27. The composition according to claim 25, wherein the carbon is in an amount that is less than about 25 weight percent carbon of the nanocomposite.

28. The composition according to claim 25, wherein the carbon is in an amount that is less than about 10 weight percent carbon of the nanocomposite.

29. The composition according to claim 13, wherein the bismuth fluoride compound of the nanocomposite comprises crystallites that are less than about 100 nm in diameter.

30. The composition according to claim 13, wherein the bismuth fluoride compound comprises crystallites that are less than about 50 nm in diameter.

31. The composition according to claim 13, wherein the bismuth fluoride compound of the nanocomposite comprises crystallites that are less than about 20 nm in diameter.

32. The composition according to claim 13, wherein the bismuth fluoride compound of the nanocomposite is $BiF_3$.

33. The composition according to claim 13, wherein the nanocomposite has a rechargeable specific capacity when a current passes through the nanocomposite in a direction opposite a discharge direction.

34. The composition according to claim 13, further comprising oxygen.

35. The composition according to claim 34, wherein the nanocomposite comprises $BiO_xF_{z-2x}$, wherein $0<x<1.5$ and $3 \leq z \leq 5$.

36. The composition according to claim 13, wherein the composition is a component of an electrode of a rechargeable battery.

37. The composition according to claim 13, wherein the bismuth fluoride compound of the nanocomposite is capable of a conversion reaction.

38. The composition according to claim 37, wherein the conversion reaction is reversible.

39. A composition comprising a bismuth fluoride compound nanocomposite, wherein the bismuth fluoride compound of the nanocomposite comprises $Bi^{3+}$, and wherein the maximum energy density of the composition is 7170 Wh/l$^{-1}$.

40. The composition according to claim 39, wherein the bismuth fluoride compound of the nanocomposite comprises a tysonite $BiF_3$ compound.

41. The composition according to claim 39, wherein the bismuth fluoride compound of the nanocomposite comprises an orthorhombic crystallite $BiF_3$ compound.

42. The composition according to claim 39, wherein the bismuth fluoride compound further comprises a metal cation in partial substitution of the Bi cation.

43. The composition according to claim 42, wherein the metal cation is a metal element selected from the group consisting essentially of Fe, B, Co, Ni, Mn, V, Mo, Pb, Sb, Cu, Sn, Nb, Cr, Ag and Zn.

44. The composition according to claim 42 wherein the metal cation is a metal element selected from the group consisting of Cu and Mo.

45. The composition according to claim 39, further comprising a conductive matrix.

46. The composition according to claim 45, wherein the conductive matrix is a conductive matrix selected from the group consisting of a metal oxide, a metal fluoride and a metal oxyfluoride.

47. The composition according to claim 46, wherein a metal from the metal oxide, the metal fluoride and the metal oxyfluoride is a metal selected from the group consisting of Fe, B, Bi, Co, Ni, Mn, V, Mo, Pb, Sb, Cu, Sn, Nb, Cr, Ag and Zn.

48. The composition according to claim 45, wherein the conductive matrix is present in an amount that is less than about 50 weight % of the nanocomposite.

49. The composition according to claim 45, wherein the conductive matrix is carbon.

50. The composition according to claim 49, wherein the carbon is in an amount that is less than about 5 weight percent of the nanocomposite.

51. The composition according to claim 39, wherein the bismuth fluoride nanocomposite further comprises carbon.

52. The composition according to claim 51, wherein the carbon is in an amount that is less than about 50 weight percent carbon of the nanocomposite.

53. The composition according to claim 51, wherein the carbon is in an amount that is less than about 25 weight percent carbon of the nanocomposite.

54. The composition according to claim 51, wherein the carbon is in an amount that is less than about 10 weight percent carbon of the nanocomposite.

55. The composition according to claim 39, wherein the bismuth fluoride compound of the nanocomposite comprises crystallites that are less than about 100 nm in diameter.

56. The composition according to claim 39, wherein the bismuth fluoride compound comprises crystallites that are less than about 50 nm in diameter.

57. The composition according to claim 39, wherein the bismuth fluoride compound of the nanocomposite comprises crystallites that are less than about 20 nm in diameter.

58. The composition according to claim 39, wherein the bismuth fluoride compound of the nanocomposite is $BiF_3$.

59. The composition according to claim 39, wherein the nanocomposite has a rechargeable specific capacity when a current passes through the nanocomposite in a direction opposite a discharge direction.

60. The composition according to claim 39, further comprising oxygen.

61. The composition according to claim 60, wherein the nanocomposite comprises $BiO_xF_{z-2x}$, wherein $0<x<1.5$ and $3 \leq z \leq 5$.

62. The composition according to claim 39, wherein the composition is a component of an electrode of a rechargeable battery.

63. The composition according to claim 39, wherein the bismuth fluoride compound of the nanocomposite is capable of a conversion reaction.

64. The composition according to claim 63, wherein the conversion reaction is reversible.

65. An electrochemical cell comprising: a negative electrode; a positive electrode comprising a bismuth fluoride compound nanocomposite, wherein the bismuth fluoride compound of the nanocomposite comprises $Bi^{3+}$; and a separator disposed between the negative and positive electrodes.

66. The cell according to claim 65, wherein the bismuth fluoride compound of the nanocomposite comprises a tysonite $BiF_3$ compound.

67. The cell according to claim 65, wherein the bismuth fluoride compound of the nanocomposite comprises an orthorhombic crystallite $BiF_3$ compound.

68. The cell according to claim 65, wherein the bismuth fluoride compound further comprises a metal cation in partial substitution of the Bi cation.

69. The cell according to claim 68, wherein the metal cation is a metal element selected from the group consisting essentially of Fe, B, Co, Ni, Mn, V, Mo, Pb, Sb, Cu, Sn, Nb, Cr, Ag and Zn.

70. The cell according to claim 68, wherein the metal cation is a metal element selected from the group consisting of Cu and Mo.

71. The cell according to claim 65, further comprising a conductive matrix.

72. The cell according to claim 71, wherein the conductive matrix is a conductive matrix selected from the group consisting of a metal oxide, a metal fluoride and a metal oxyfluoride.

73. The composition according to claim 72, wherein a metal from the metal oxide, the metal fluoride and the metal oxyfluoride is a metal selected from the group consisting of Fe, B, Bi, Co, Ni, Mn, V, Mo, Pb, Sb, Cu, Sn, Nb, Cr, Ag and Zn.

74. The cell according to claim 71, wherein the conductive matrix is present in an amount that is less than about 50 weight % of the nanocomposite.

75. The cell according to claim 71, wherein the conductive matrix is carbon.

76. The cell according to claim 75, wherein the carbon is in an amount that is less than about 5 weight percent of the nanocomposite.

77. The cell according to claim 65, wherein the bismuth fluoride nanocomposite further comprises carbon.

78. The cell according to claim 77, wherein the carbon is in an amount that is less than about 50 weight percent carbon of the nanocomposite.

79. The cell according to claim 77, wherein the carbon is in an amount that is less than about 25 weight percent carbon of the nanocomposite.

80. The cell according to claim 77, wherein the carbon is in an amount that is less than about 10 weight percent carbon of the nanocomposite.

81. The cell according to claim 65, wherein the bismuth fluoride compound of the nanocomposite comprises crystallites that are less than about 100 nm in diameter.

82. The cell according to claim 65, wherein the bismuth fluoride compound comprises crystallites that are less than about 50 nm in diameter.

83. The cell according to claim 65, wherein the bismuth fluoride compound of the nanocomposite comprises crystallites that are less than about 20 nm in diameter.

84. The cell according to claim 65, wherein the bismuth fluoride compound of the nanocomposite is $BiF_3$.

85. The cell according to claim 65, wherein the nanocomposite has a rechargeable specific capacity when a current passes through the nanocomposite in a direction opposite a discharge direction.

86. The cell according to claim 65, wherein the nanocomposite further comprises oxygen.

87. The cell according to claim 86, wherein the nanocomposite comprises $BiO_xF_{z-2x}$, wherein $0<x<1.5$ and $3 \leq z \leq 5$.

88. The cell according to claim 65, wherein the bismuth fluoride compound of the nanocomposite is capable of a conversion reaction.

89. The cell according to claim 88, wherein the conversion reaction is reversible.

* * * * *